(12) United States Patent
Morishita et al.

(10) Patent No.: US 8,960,811 B2
(45) Date of Patent: Feb. 24, 2015

(54) BRAKE APPARATUS FOR VEHICLE

(75) Inventors: Kazuya Morishita, Obu (JP); Shintaro Osaki, Nisshin (JP)

(73) Assignee: Advics Co., Ltd., Kariya-shi, Aichi-ken (JP)

( * ) Notice: Subject to any disclaimer, the term of this patent is extended or adjusted under 35 U.S.C. 154(b) by 298 days.

(21) Appl. No.: 13/532,581

(22) Filed: Jun. 25, 2012

(65) Prior Publication Data

US 2013/0026817 A1 Jan. 31, 2013

(30) Foreign Application Priority Data

Jun. 24, 2011 (JP) ................... 2011-140655

(51) Int. Cl.
*B60T 13/74* (2006.01)
*B60T 13/58* (2006.01)
*B60T 1/10* (2006.01)
*B60T 7/04* (2006.01)
*B60T 8/40* (2006.01)
*B60T 13/68* (2006.01)

(52) U.S. Cl.
CPC .............. *B60T 13/586* (2013.01); *B60T 1/10* (2013.01); *B60T 7/042* (2013.01); *B60T 8/4059* (2013.01); *B60T 13/686* (2013.01); *B60T 2270/402* (2013.01); *B60T 2270/604* (2013.01)
USPC ..... 303/3; 303/10; 303/11; 303/15; 303/122.12

(58) Field of Classification Search
USPC .......... 303/3, 10, 11, 15, 116.1, 122.12, 152; 310/68 B; 318/362–382; 701/70
See application file for complete search history.

(56) References Cited

U.S. PATENT DOCUMENTS

| | | | |
|---|---|---|---|
| 6,402,264 B1* | 6/2002 | Otomo | 303/115.4 |
| 7,605,555 B2* | 10/2009 | Kurokochi | 318/376 |
| 8,251,461 B2* | 8/2012 | Atsushi et al. | 303/16 |
| 2005/0269875 A1 | 12/2005 | Maki et al. | |
| 2007/0188014 A1* | 8/2007 | Sato et al. | 303/11 |
| 2007/0194621 A1* | 8/2007 | Ishizuka | 303/122.12 |
| 2007/0284936 A1* | 12/2007 | Maki et al. | 303/15 |
| 2008/0236964 A1* | 10/2008 | Kikuchi et al. | 188/162 |
| 2009/0243382 A1* | 10/2009 | Yamauchi et al. | 303/155 |
| 2013/0057051 A1* | 3/2013 | Matsuura et al. | 303/3 |

FOREIGN PATENT DOCUMENTS

| | | |
|---|---|---|
| JP | 10-119748 A | 5/1998 |
| JP | 2006-021745 A | 1/2006 |

* cited by examiner

*Primary Examiner* — Thomas J Williams
*Assistant Examiner* — Mariano Sy
(74) *Attorney, Agent, or Firm* — Buchanan Ingersoll & Rooney PC

(57) ABSTRACT

A brake apparatus includes: a fluid pressure control valve; a fluid pressure pump; a feedback control circuit correcting a control power corresponding to a feedback control target rotation number of a motor and feed the corrected control power to a motor; a feed forward control circuit configured to feed, to the motor, a control power corresponding to a feed-forward control target rotation number of the motor; and an abnormal control fluid pressure generation control device, if a rotation number detector is abnormal, rotating the electric motor with the rotation number higher than the feedback control target rotation number by a margin rotation number, increases the brake fluid passing through the fluid pressure control valve, and changes the control current to be supplied to the fluid pressure control valve so that the wheel cylinder fluid pressure is not changed.

6 Claims, 12 Drawing Sheets

BRAKE APPARATUS FOR VEHICLE

CROSS-REFERENCE TO RELATED APPLICATION

This application is based upon and claims the benefit of priority of Japanese Patent Application No. 2011-140655 filed on Jun. 24, 2011, the contents of which are incorporated herein by reference in its entirety.

BACKGROUND

The invention relates to a brake apparatus for a vehicle that switches feedback control into feed forward control and thus continues rotation control when a motor rotation number cannot be detected due to any cause during the feedback control of the motor rotation number and thus the feedback control cannot be performed.

For example, JP-A-2006-21745 discloses a brake apparatus for a vehicle having a fluid pressure brake apparatus and a regenerative brake device. The fluid pressure brake apparatus generates a basic fluid pressure corresponding to a brake operation by a master cylinder, and applies the generated basic fluid pressure to wheel cylinders of the respective wheels connected by an oil path having the master cylinder and a fluid pressure control valve, thereby generating a basic fluid pressure braking force for each wheel. The fluid pressure brake apparatus drives an electric motor in response to a control fluid pressure command value to thus drive a fluid pressure pump provided to the fluid pressure control valve and to thus generate a control fluid pressure and applies the generated control fluid pressure to the wheel cylinders, thereby generating a control fluid pressure braking force for each wheel. The regenerative brake device generates a regenerative braking force corresponding to a brake operating state for any one of the wheels.

In the brake apparatus for a vehicle, when the regenerative braking force varies in response to a driver-request braking force and thus proves deficient, the deficiency of the regenerative braking force is compensated by the control fluid pressure braking force. That is, the electric motor is driven at high rotation number to thus increase a discharge flow rate of a fluid pressure pump and a brake fluid having an unnecessary flow rate part regarding a necessary flow rate part is made to escape from the fluid pressure control valve to the master cylinder, thereby adjusting the control fluid pressure. According to the above brake apparatus for a vehicle, it is possible to cope with a situation where the regenerative braking force proves deficient with respect to the request braking force, with good responsiveness, as required.

JP-A-10-119748 discloses a brake apparatus for a vehicle having a device that controls a motor rotation number to thus change a discharge flow rate of a pump and thus controls a control fluid pressure. According to this brake apparatus for a vehicle, when it is required to increase flow rate consumption of a brake fluid pressure due to an operation of rapidly pedaling a brake, it is possible to enhance the responsiveness by increasing the motor rotation number to thereby increase the discharge flow rate of the pump.

In the brake apparatus for a vehicle having the fluid pressure brake apparatus and the regenerative brake device, the durability of the electric motor, which drives the fluid pressure pump for generating the control fluid pressure frequently operating in a brake region, is important. According to the brake apparatus for a vehicle disclosed in JP-A-2006-21745, the electric motor should be driven at a high rotation number, so that the lifespan of the electric motor may end at an early stage. According to the brake apparatus for a vehicle disclosed in JP-A-10-119748, since the motor rotation number is controlled so as to change the discharge flow rate of the pump, it is possible to increase the durability of the electric motor. However, since the pedaling degree of the brake pedal varies every moment, the load to be applied to the fluid pressure pump is also varied. Regarding this, it is not suggested how to control the motor rotation number in this situation.

Regarding the motor, it is effective to decrease a rotation number thereof so as to enhance the lifespan. Regarding this, JP-A-10-119748 suggests feedback (FB) control of detecting a motor rotation number and thus appropriately correcting a voltage to be applied to a motor. The feedback control is performed so that a detected motor rotation number is the same as a target rotation number of the FB control. Although not described in JP-A-10-119748, when a motor rotation number cannot be detected due to any cause and the feedback control cannot be thus performed, it is considered that the feedback control is switched into feed forward (FF) control and thus the rotation control is continuously performed. At this time, a target rotation number of the FF control is set to be higher than the target rotation number of the FB control so that a braking force of wheels does not prove deficient due to the insufficient rotation number even when an estimated rotation number has an estimated error. Hence, when the control is switched from the feedback control to the feed forward control, a command value of the motor rotation number is abruptly increased to the target rotation number of the FF control, as shown with an arrow r1 in FIG. 17B. When a control current (which is indicated by an arrow i1 in FIG. 17C) of a fluid pressure control valve connected between a master cylinder and a wheel cylinder is suddenly decreased so as to follow the increased motor rotation number, the fluid pressure control valve is abruptly opened. However, the motor rotates with the target rotation number of the FF control in accordance with a time constant thereof and a pumping flow rate of a pump does not abruptly follow even when the motor reaches the target rotation number of the FF control. Thus, since a brake fluid having a flow rate larger than ever is relieved from the abruptly opened fluid pressure control valve, a fluid pressure of the wheel cylinder is abruptly decreased, as shown with a curve wc1 in FIG. 17D.

Like this, when the control is switched from the feedback control to the feed forward control, a difference is caused between the pumping flow rate of the pump and a degree of opening of the fluid pressure control valve. Thereby, the brake fluid pressure of the wheel cylinder is not smoothly changed, so that a driver feels uncomfortable upon a brake operation.

SUMMARY

The invention has been made to solve the above problem. An object is to provide a brake apparatus for a vehicle that can control a fluid pressure of a wheel cylinder not to be abruptly lowered when control is switched from feedback control to feed forward control and thus disable a driver from feeling uncomfortable upon a brake operation.

In order to achieve the objective, there is provided an improved brake apparatus for a vehicle includes:

a master cylinder configured to generate a master cylinder fluid pressure corresponding to a brake operation;

a wheel brake device that is provided for each wheel and configured to apply a braking force to the wheels as a brake fluid is supplied from the master cylinder to wheel cylinders;

a fluid pressure control valve connected between the master cylinder and the wheel cylinder;

a fluid pressure pump having a discharge port communicating between the fluid pressure control valve and the wheel cylinders and a suction port communicating between the master cylinder and the fluid pressure control valve;

an electric motor configured to drive the fluid pressure pump;

a rotation number detector configured to detect a motor rotation number of the electric motor;

a feedback control circuit configured to correct a control power corresponding to an feedback control target rotation number of the electric motor in response to a difference between the motor rotation number detected by the rotation number detector and the feedback control target rotation number of the electric motor and feed the corrected control power to a driving circuit of the electric motor;

a feed forward control circuit configured to feed, to the driving circuit, a control power corresponding to an feed-forward control target rotation number of the electric motor;

a control fluid pressure generation control device configured to rotate the electric motor with the feedback control target rotation number by the feedback control circuit to circulate a brake fluid having a target flow rate from the fluid pressure pump to the fluid pressure control valve and supply a control current to the fluid pressure control valve to control a wheel cylinder fluid pressure occurring in the wheel cylinder so that the wheel cylinder pressure is higher than the master cylinder fluid pressure by a control fluid pressure; and an abnormal control fluid pressure generation control device configured to, if an abnormality detection device detects that the rotation number detector is abnormal, rotates the electric motor with the feed-forward control target rotation number by the feed forward control circuit, which is higher than the feedback control target rotation number by a margin rotation number, gradually increases the brake fluid passing through the fluid pressure control valve as the electric motor is rotated with the feed-forward control target rotation number, which is higher by the margin rotation number, and gradually changes the control current to be supplied to the fluid pressure control valve so that the wheel cylinder fluid pressure is not changed.

DESCRIPTION OF EXEMPLARY EMBODIMENTS

Figure 1:
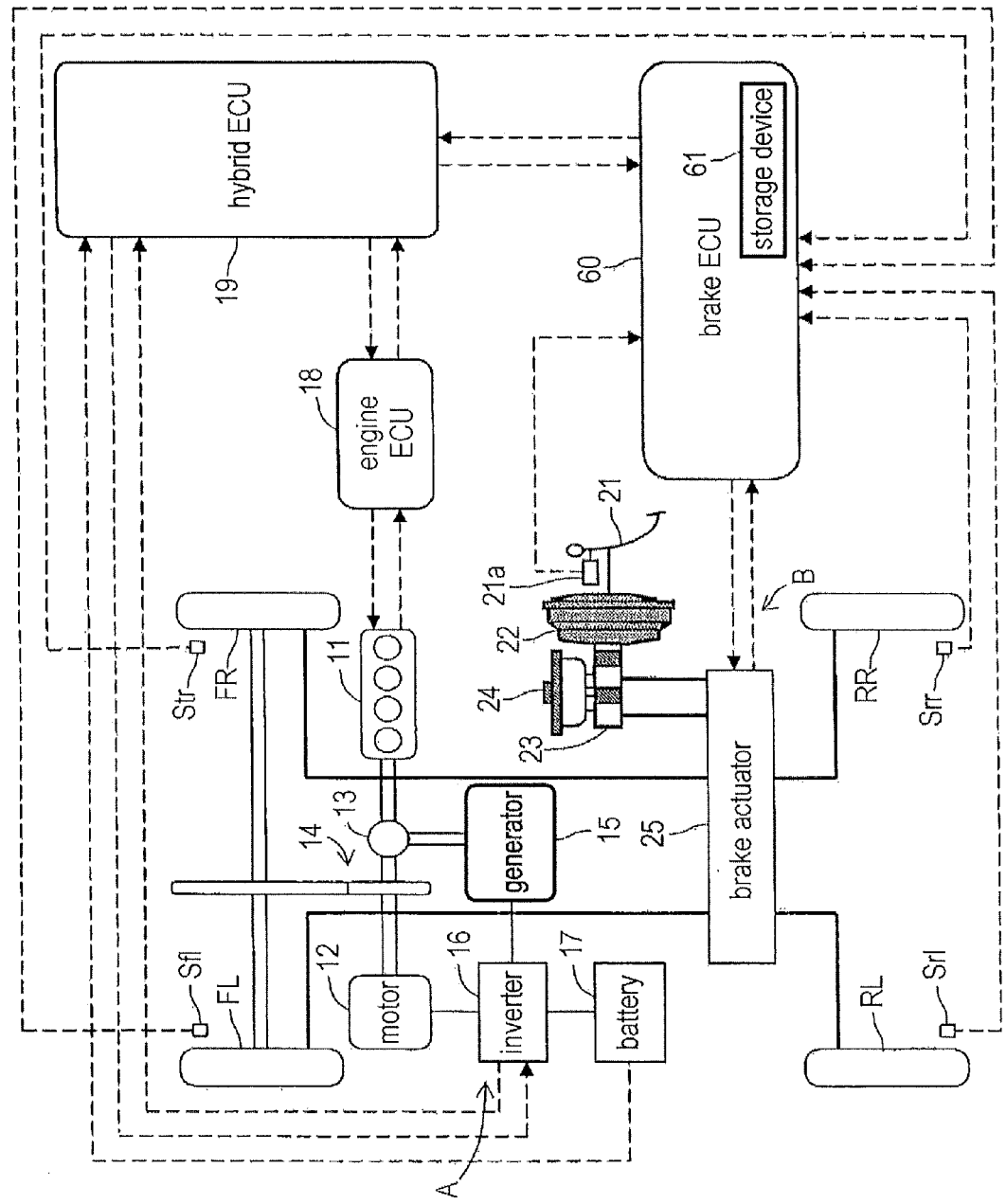
FIG. 1 is an outline view showing a vehicle to which a brake apparatus for a vehicle according to an exemplary embodiment is applied.

Hereinafter, a hybrid vehicle including a brake apparatus for a vehicle according to an exemplary embodiment will be described with reference to the drawings. As shown in FIG. 1, the brake apparatus for a vehicle is configured so that it is applied to a hybrid vehicle, and has a fluid pressure brake apparatus B, a regenerative brake device A, a brake ECU (electronic control unit) 60 that cooperatively controls the fluid pressure brake apparatus B and the regenerative brake device A, a hybrid ECU (electronic control unit) 19 that controls a motor 12, which is a driving source of the hybrid vehicle, via an inverter 16 in response to a request value from the brake ECU 60, and the like.

The hybrid vehicle is a vehicle that drives driving wheels, for example left and right front wheels FL, FR by a hybrid system. The hybrid system is a power train that combines and uses two types of driving sources, i.e., an engine 11 and the motor 12. The hybrid system includes a parallel hybrid system that directly drives the wheels from the engine 11 and the motor 12 and a series hybrid system in which the wheels are driven by the motor 12 and the engine 11 serves as a power feeding source to the motor 12. The hybrid vehicle of this exemplary embodiment is mounted with the parallel hybrid system.

In the hybrid vehicle having the parallel hybrid system mounted thereto, a driving force of the engine 11 is transmitted to driving wheels (left and right front wheels FL, FR, in this exemplary embodiment) via a power division mechanism 13 and a power transmission mechanism 14 and a driving force of the motor 12 is transmitted to the driving wheels via the power transmission mechanism 14. The power division mechanism 13 appropriately divides the driving force of the engine 11 into a vehicle driving force and a generator driving force. The power transmission mechanism 14 appropriately combines the driving forces of the engine 11 and the motor 12 depending on driving conditions and transmits the same to the driving wheels. The power transmission mechanism 14 adjusts a ratio of the driving forces to be transmitted from the engine 11 and the motor 12 within a range of 0:100 to 100:0. The power transmission mechanism 14 has a speed changing function.

The engine 11 is controlled by an engine ECU (electronic control unit) 18, and the engine ECU 18 outputs an opening command to an electronic control throttle (not shown) in response to an engine output request value from the hybrid ECU 19 that will be described later, thereby adjusting a rotation number of the engine 11. The motor 12 assists an output of the engine 11 to thus increase the driving force thereof, and performs electric generation to thereby charge a battery 17 upon braking of the vehicle. A generator 15 performs the electric generation by the output of the engine 11, and has a starter function upon starting of the engine. The motor 12 and the generator 15 are electrically connected to the inverter 16, respectively. The inverter 16 is electrically connected to the battery 17 that is a direct current power supply and converts an alternating current voltage input from the motor 12 and the generator 15 into a direct current voltage and supplies the same to the battery 17 or converts a direct current voltage from the battery 17 into an alternating current voltage and outputs the same to the motor 12 and the generator 15.

The regenerative brake device A has the motor 12, the inverter 16, the battery 17 and the like. The regenerative brake device A generates a regenerative braking force, which is based on a brake operating state detected by a brake operating state detection means, for any one side (left and right front wheels FL, FR to be driven by the motor 12 serving as a driving source, in this exemplary embodiment) of the respective wheels FL, FR, RL, RR. The brake operating state is an operating state of a brake pedal 21, and includes a master cylinder pressure relating to a pedaling force on the brake pedal 21, a stroke amount of the brake pedal 21, a pedaling force on the brake pedal 21 and the like, for example. The brake operating state detection means detects the brake operating state and includes a pressure sensor P detecting a master cylinder pressure, a pedal stroke sensor 21a detecting a stroke amount of the brake pedal 21, and the like.

The hybrid ECU 19 is connected with the inverter 16 so that they can communicate with each other. The hybrid ECU 19 derives a necessary engine output, electric motor torque and generator torque from an accelerator opening and a shift position (which is calculated from a shift position sensor input from a shift position sensor (not shown)), and transmits the derived engine output request value to the engine ECU 18 to thereby control the driving force of the engine 11. The hybrid ECU 19 controls the motor 12 and the generator 15 through the inverter 16 in response to the derived electric motor torque request value and generator torque request value. The hybrid ECU 19 is connected with the battery 17 and monitors a charged state of the battery 17, a charging current and the like. The hybrid ECU 19 is connected with an accelerator opening sensor (not shown) that is incorporated into an accelerator pedal (not shown) and detects an accelerator opening of a vehicle, and is also input with an accelerator opening signal from the accelerator opening sensor.

The fluid pressure brake apparatus B has a wheel brake device (basic fluid pressure braking force generation device), a brake actuator (control fluid pressure braking force generation device) 25 and the like. The fluid pressure brake apparatus B directly applies the fluid pressure braking force to the respective wheels FL, FR, RL, RR to thus brake the vehicle. The wheel brake device has a negative pressure booster 22 that is a boosting apparatus applying a suction negative pressure to a diaphragm to thus assist and boost (increase) a brake operating force, which is caused as the brake pedal 21 is stepped, a master cylinder 23 that generates a brake fluid (oil) having a fluid pressure (oil pressure), which is a basic fluid pressure corresponding to a brake operating force (i.e., operating state of the brake pedal 21) boosted by the negative pressure booster 22, and supplies the generated brake fluid to wheel cylinders WC1 to WC4, and a reservoir tank 24 that stores the brake fluid therein and supplies the brake fluid to the master cylinder 23. The brake actuator 25 is provided between the master cylinder 23 and the wheel cylinders WC1 to WC4.

Figure 2:
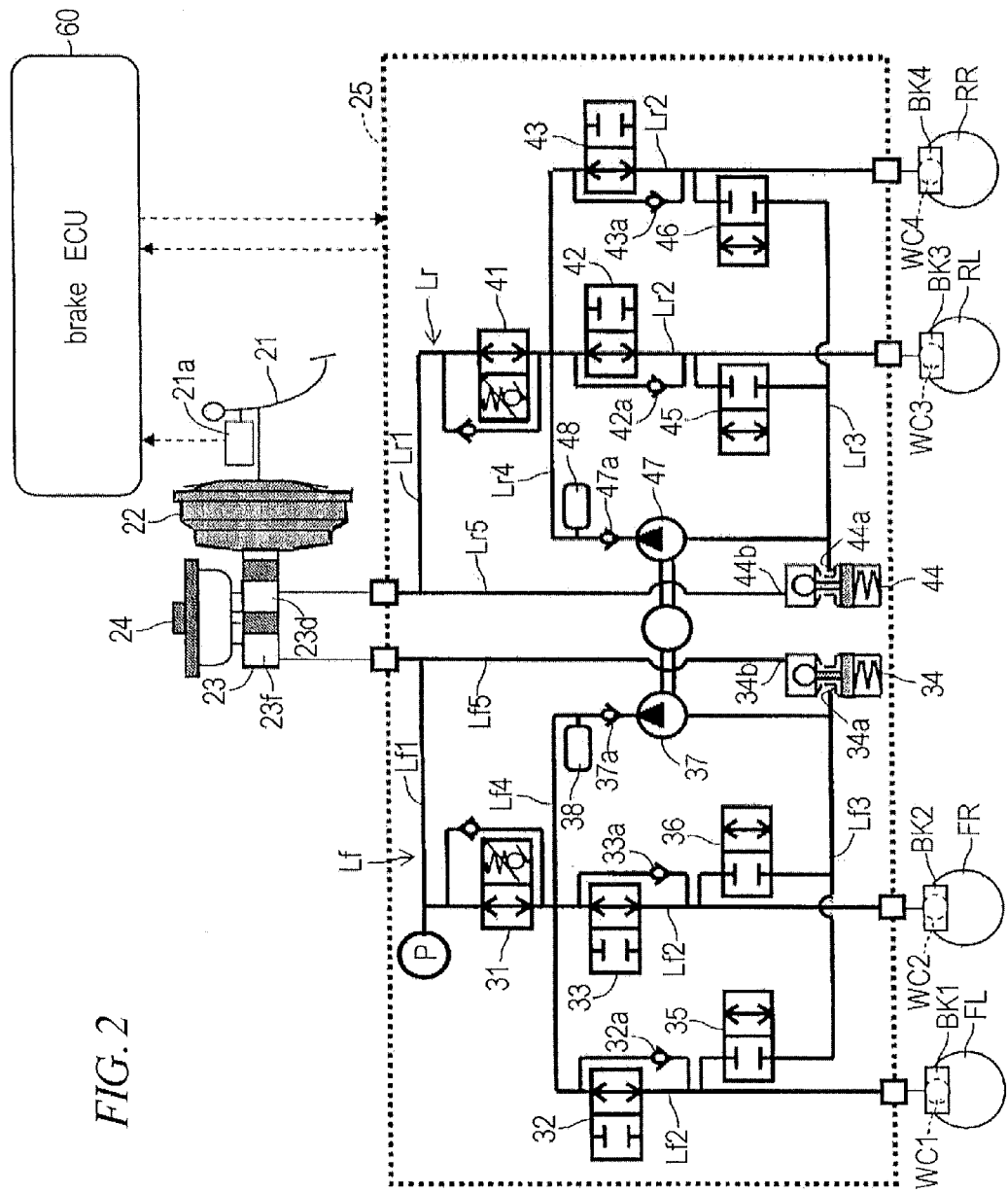
FIG. 2 shows a fluid pressure brake apparatus of the brake apparatus for a vehicle shown in FIG. 1.

As shown in FIG. 2, the wheel brake device generates the basic fluid pressure, which corresponds to the brake operating state resulting from the stepping on the brake pedal 21, by the master cylinder 23, and directly applies the generated basic fluid pressure to the wheel cylinders WC1, WC2, WC3, WC4 of the respective wheels FL, FR, RL, RR connected by oil paths Lf, Lr having the master cylinder 23 and fluid pressure control valves 31, 41, thereby generating a basic fluid pressure braking force corresponding to the basic fluid pressure for each of the wheels FL, FR, RL, RR. The brake actuator 25 applies a control fluid pressure, which is formed by driving of fluid pressure pumps 37, 47 and control of the fluid pressure control valves 31, 41 independently of the basic fluid pressure generated in correspondence to the brake operating state, to the wheel cylinders WC1, WC2, WC3, WC4 of the respective wheels FL, FR, RL, RR, thereby generating a control fluid pressure braking force for each of the wheels FL, FR, RL, RR.

A brake piping system of the fluid pressure brake apparatus B is configured by a front/rear piping system, and first and second fluid pressure chambers 23d, 23f of the master cylinder 23 are connected to the oil paths Lr, Lf, respectively. The oil path Lr enables the first fluid pressure chamber 23d and the wheel cylinders WC3, WC4 of the left and right rear wheels RL, RR to communicate with each other, and the oil path Lf enables the second fluid pressure chamber 23f and the wheel cylinders WC1, WC2 of the left and right front wheels FL, FR to communicate with each other. When the fluid pressure (basic fluid pressure, control fluid pressure) is supplied from the master cylinder 23 via the oil paths Lf, Lr, the respective wheel cylinders WC1, WC2, WC3, WC4 operate respective brake means BK1, BK2, BK3, BK4, which are provided in correspondence to the respective wheel cylinders WC1, WC2, WC3, WC4, thereby applying the fluid pressure braking force (basic fluid pressure barking force, control fluid pressure braking force) to the respective wheels FL, FR, RL, RR. Each of the brake means BK1, BK2, BK3, BK4 includes a disc brake, a drum brake and the like, and is configured to restrain rotation of a disc rotor, a brake drum and the like in which a friction member such as a brake pad, a brake shoe and the like is integrated with a wheel.

The brake actuator 25 is specifically described with reference to FIG. 2. The brake actuator 25 is generally well known and is configured by packaging the fluid pressure control valves 31, 41, pressure boost control valves 32, 33, 42, 43 and pressure reduction control valves 35, 36, 45, 46 configuring an ABS control valve, pressure adjusting reservoirs 34, 44, fluid pressure pumps 37, 47, an electric motor M and the like into one case. The fluid pressure control valves 31, 41, the fluid pressure pumps 37, 47 and the like configure a control fluid pressure generation device.

First, a configuration of a front wheel system of the brake actuator 25 is described. The oil path Lf is provided with the fluid pressure control valve 31 configured by a differential pressure control valve. The fluid pressure control valve 31 is switched between a communication state and a differential pressure state by the brake ECU 60. Typically, the fluid pressure control valve 31 is under communication state. However, when it is switched to the differential pressure state, it is possible to keep an oil path Lf2 of the wheel cylinders WC1, WC2-side at a pressure higher than an oil path Lf1 of the master cylinder 23-side by a predetermined control differential pressure. The control differential pressure is adjusted in response to the control current by the brake ECU 60. Specifically, the fluid pressure control valve 31 has a valve port having a small diameter and operates in a manner of a relief valve. That is, when a pressure of the wheel cylinder-side becomes higher than a pressure of the master cylinder-side by a predetermined pressure, the valve portion of the fluid pressure control valve 31 functions as a restriction hole and the differential pressure (driving differential pressure) occurs between the master cylinder side and the wheel cylinder side of the fluid pressure control valve.

The oil path Lf2 is branched into two. One oil path is provided with the pressure boost control valve 32 that controls the boosting of the brake fluid pressure regarding the wheel cylinder WC1 in a boosting mode of the ABS control, and the other oil path is provided with the pressure boost control valve 33 that controls the boosting of the brake fluid pressure with respect to the wheel cylinder WC2 in the boosting mode of the ABS control. The pressure boost control valves 32, 33 are two-position valves that can control the communication/cut-off states by the brake ECU 60. When the pressure boost control valves 32, 33 are controlled at the communication state, it is possible to apply at least one of the basic fluid pressure of the master cylinder 23 and the control fluid pressure formed by the driving of the fluid pressure pump 37 and the control of the fluid pressure control valve 31 to the respective wheel cylinders WC1, WC2. The pressure boost control valves 32, 33 can perform the ABS control together with the pressure reduction control valves 35, 36 and the fluid pressure pump 37.

In the meantime, at the normal brake state at which the ABS control is not performed, the pressure boost control valves 32, 33 are controlled at the communication state all the time. The pressure boost control valves 32, 33 are provided with safety valves 32a, 33a in parallel, respectively, so that when the driver separates the foot from the brake pedal 21 at the ABS control, the brake fluid is correspondingly returned from the wheel cylinders WC1, WC2 to the reservoir tank 24.

The oil paths Lf2 between the pressure boost control valves 32, 33 and the respective wheel cylinders WC1, WC2 communicate with a reservoir hole 34a of the pressure adjusting reservoir 34 via an oil path Lf3. The oil path Lf3 is provided with the pressure reduction control valves 35, 36 that can control the communication/cut-off state by the brake ECU 60. The pressure reduction control valves 35, 36 are controlled at the cut-off state all the time at the normal brake state (at which the ABS does not operate), and allows the brake fluid to escape to the pressure adjusting reservoir 34 through the oil path Lf3 at the communication state, thereby controlling the brake fluid pressure in the wheel cylinders WC1, WC2 to thus prevent the wheels from being locked.

An oil path Lf4 connecting the oil paths Lf2 between the fluid pressure control valve 31 and the pressure boost control valves 32, 33 and the reservoir hole 34a of the pressure adjusting reservoir 34 is provided with the fluid pressure pump 37 together with a safety valve 37a. An oil path Lf5 is provided so as to connect the reservoir hole 34b of the pressure adjusting reservoir 34 to the master cylinder 23 via the oil path Lf1. The fluid pressure pump 37 is driven by the electric motor M in response to a command of the brake ECU 60. In a pressure reduction mode of the ABS control, the fluid pressure pump 37 sucks the brake fluid in the wheel cylinders WC1, WC2 or brake fluid reserved in the pressure adjusting reservoir 34 and returns the same to the master cylinder 23 via the fluid pressure control valve 31 under communication state. When forming the control fluid pressure for stably controlling a vehicle attitude, such as ESC control, traction control, brake assist and the like, the fluid pressure pump 37 sucks the brake fluid in the master cylinder 23 via the oil paths Lf1, Lf5 and the pressure adjusting reservoir 34 and discharges the same to the respective wheel cylinders WC1, WC2 via the oil paths Lf4, Lf2 and the pressure boost control valves 32, 33 under communication state so as to generate a control differential pressure in the fluid pressure control valve 31 switched to the differential pressure state, thereby applying the control fluid pressure. In the meantime, a damper 38 is disposed at an upstream side of the fluid pressure pump 37 on the oil path Lf4 so as to relieve a pulsation of the brake fluid discharged by the fluid pressure pump 37.

The oil path Lf1 is provided with a pressure sensor P detecting a master cylinder pressure that is a brake fluid pressure in the master cylinder 23, and a detection signal thereof is transmitted to the brake ECU 60. In the meantime, the pressure sensor P may be provided on an oil path Lr1. The master cylinder pressure is one of the brake operating states. The other brake operating state includes a pedal stroke of the brake pedal 21. The pedal stroke is detected by a pedal stroke sensor 21a annexed to the brake pedal 21. A detection signal thereof is transmitted to the brake ECU 60.

The rear wheel system of the brake actuator has the same configuration as the above front wheel system. An oil path Lr configuring the rear wheel system has oil paths Lr1 to Lr5, like the oil path Lf. The oil path Lr is provided with the fluid pressure control valve 41, which is the same as the fluid pressure control valve 31, and the pressure adjusting reservoir 44, which is the same as the pressure adjusting reservoir 34. The branched oil paths Lr2, Lr2 communicating with the wheel cylinders WC3, WC4 are provided with the pressure boost control valves 42, 43, which are the same as the pressure boost control valves 32, 33, and the oil path Lr3 is provided with the pressure reduction control valves 45, 46, which are the same as the pressure reduction control valves 35, 36. The oil path Lr4 is provided with the fluid pressure pump 47, a safety valve 47a and a damper 48, which are the same as the fluid pressure pump 37, the safety valve 37a and the damper 38. In the meantime, the pressure boost control valves 42, 43 are provided with safety valves 42a, 43a in parallel, respectively, which are the same as the safety valves 32a, 33a. By the brake actuator 25 configured as described above, the control fluid pressure, which is formed by the driving of the fluid pressure pumps 37, 47 and the control of the fluid pressure control valves 31, 41, is applied to the wheel cylinders WC1, WC2, WC3, WC4 of the respective wheels FL, FR, RL, RR. Thereby, it is possible to generate the control fluid pressure braking force for the respective wheels FL, FR, RL, RR.

The brake ECU 60 has a microcomputer (not shown). The microcomputer has an input/output interface, a CPU, a RAM and a ROM (all of which are not shown) that are connected via a bus. As shown in FIG. 1, the brake ECU 60 is connected to wheel speed sensors Sfl, Sfr, Srr, Srl, the pressure sensor P, the respective control valves 31, 32, 33, 35, 36, 41, 42, 43, 45, 46 and the electric motor M. The wheel speed sensors Sfl, Sfr, Srr, Srl are respectively provided in the vicinity of the respective wheels FL, FR, RL, RR and output pulse signals of frequencies corresponding to rotations of the respective wheels FL, FR, RL, RR to the brake ECU 60.

The CPU executes a braking control program for a vehicle to thus control the electric motor M of the fluid pressure brake apparatus B and the state switching or energization current of the respective control valves 31, 32, 33, 35, 36, 41, 42, 43, 45, 46 of the fluid pressure brake apparatus B, based on the detection signals from the respective sensors and an actual regenerative execution value from the hybrid ECU 19, thereby controlling the control fluid pressure to be applied to the wheel cylinders WC1 to WC4, i.e., the control fluid pressure braking force to be applied to the respective wheels FL, FR, RL, RR. The RAM temporarily stores parameters necessary to execute the braking control program for a vehicle, and the ROM stores the braking control program for a vehicle.

The brake ECU 60 is connected to the hybrid ECU 19 so that they can communicate with each other, and performs cooperation control of the regenerative brake performed by the motor 12 and the hydraulic brake so that a total braking force of a vehicle becomes equal to that of a vehicle having the hydraulic brake only. Specifically, the brake ECU 60 commands the hybrid ECU 19 to output a request regenerative braking force, which is an amount of the total braking force to be shared by the regenerative brake device, in response to the driver's braking request, i.e., braking operating state. Based on the input command of outputting the request regenerative braking force, the hybrid ECU 19 derives an actual regenerative execution value serving as an actual regenerative brake, considering the vehicle speed, the charged state of the battery and the like, controls the motor 12 via the inverter 16 so as to generate a regenerative braking force equivalent to the actual regenerative execution value, and outputs the derived actual regenerative execution value to the brake ECU 60.

Here, upon the regenerative cooperation, when the regenerative braking force (the regenerative part in FIG. 3) decreases as the vehicle speed decreases, the total braking force of the vehicle drops, so that only the basic fluid pressure braking force (VB hydraulic part in FIG. 3) may be finally obtained in some cases. In this case, by applying the control fluid pressure braking force (ESC pressurization part in FIG. 3), instead of the regenerative braking force, it is possible to compensate for the decrease of the regenerative braking force and to thus keep the total braking force constant. The applying of the control fluid pressure braking force instead of the regenerative braking force is referred to as a replacement of the regenerative braking force and the control fluid pressure braking force. As long as the regenerative braking force is used, the replacement is infallibly made before the vehicle stops and is frequently performed while the vehicle is used. Hence, it is necessary for the electric motor M, which drives the fluid pressure pumps 37, 47, to have the long lifespan. In the braking control program for a vehicle of this exemplary embodiment, the rotation number of the electric motor M is subject to the FB control at the normal state, thereby improving the durability thereof.

Figure 3:
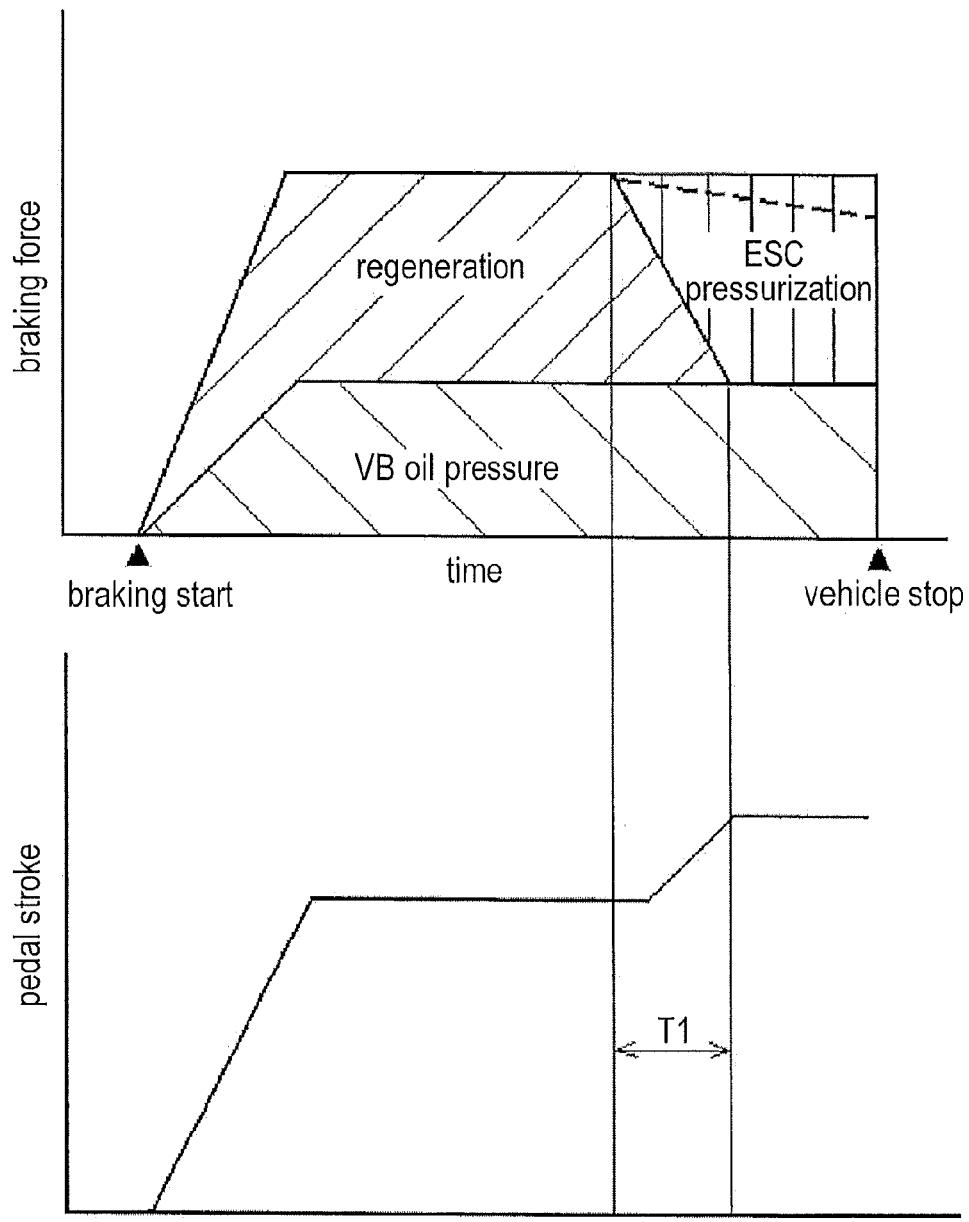
FIG. 3 shows a relation of a regenerative braking force and a fluid pressure braking force upon replacement therebetween.

Meanwhile, in FIG. 3, in a time period T1 during which the replacement occurs, the total braking force is constant and is not changed. However, the control fluid pressure is applied by the operation of the fluid pressure pumps 37, 47. Thereby, the brake pedal 21 is largely drawn into, so that the driver may feel uncomfortable. In order to prevent this, it is preferable to perform control (refer to the dotted line of the ESC pressurization in FIG. 3) of reducing the total braking force, i.e., the control fluid pressure braking force during a time period from time at which the replacement starts to time at which the vehicle stops. By doing so, it is possible to suppress the control fluid pressure braking force smaller, which should be generated in the replacement time period, compared to the above-described case. Hence, it is possible to suppress the amount that the brake pedal 21 is drawn into to a level that the driver does not feel and also to suppress a variation amount of the vehicle deceleration to a level that the driver does not feel.

Figure 9:
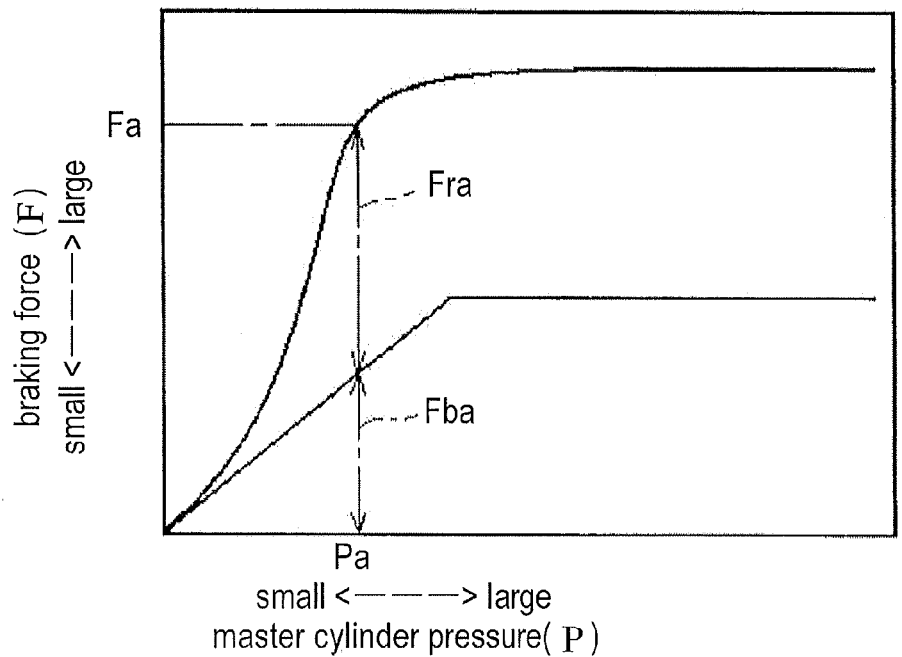
FIG. 9 shows a relation between a master cylinder pressure occurring in response to a brake operation and a total braking force (braking force expressed by a sum of a basic fluid pressure braking force and a regenerative braking force and a control fluid pressure braking force, if necessary) corresponding to an amount of the brake operation.
Figure 10:
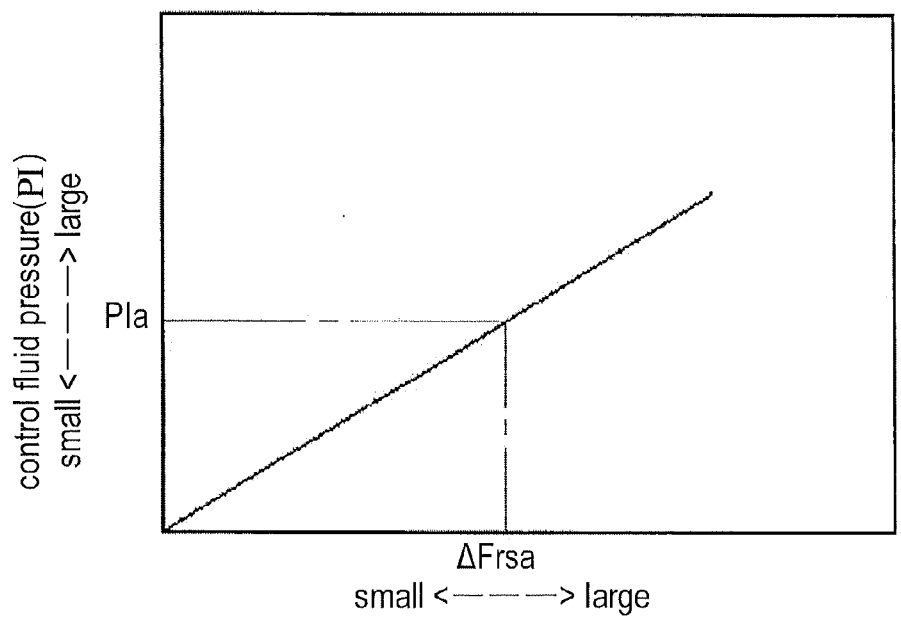
FIG. 10 shows a relation between a difference of a regenerative braking force corresponding to an amount of the brake operation and a regenerative braking force that can be generated by a regenerative brake device and a control fluid pressure of a fluid pressure control valve by a brake fluid that is discharged from a fluid pressure pump as an electric motor is driven.

The brake ECU 60 has a storage device 61. The storage device 61 stores therein maps shown in FIGS. 9 to 13, for example, tables or calculation equations necessary to execute the braking control program for a vehicle. FIG. 9 shows a relation between a master cylinder pressure P occurring in response to a brake operation and a total braking force F (braking force expressed by a sum of a basic fluid pressure braking force and a regenerative braking force and a control fluid pressure braking force, if necessary) corresponding to an amount of the brake operation. In the meantime, a map, a table or a calculation equation showing a relation between a stroke of the brake pedal 21 and a request braking force, instead of the master cylinder pressure, may be stored.

Figure 11:
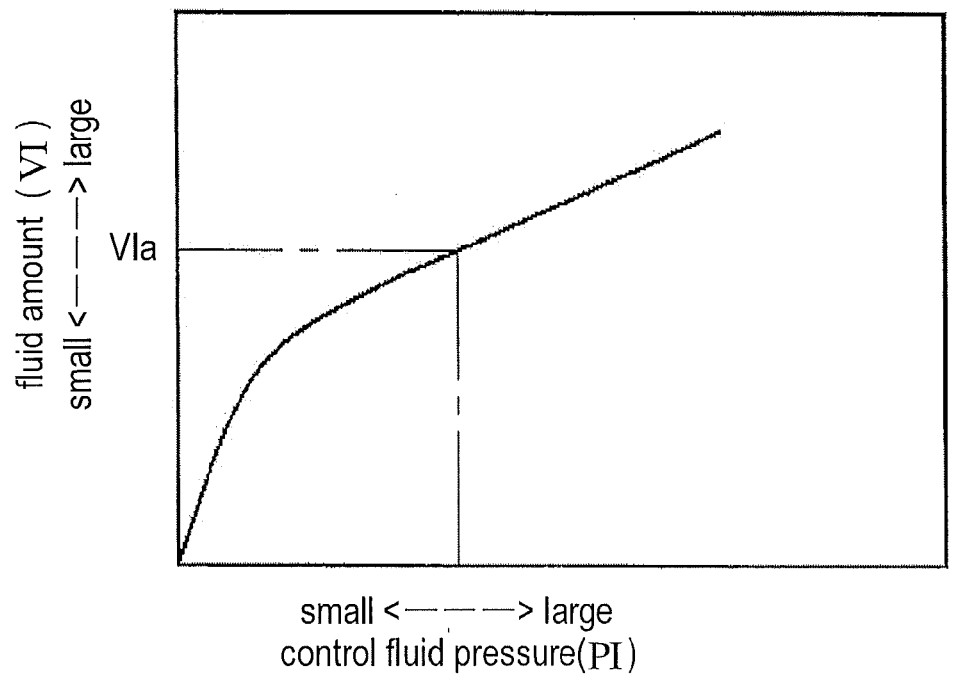
FIG. 11 shows a relation between a control fluid pressure of a fluid pressure control valve by a brake fluid that is discharged from a fluid pressure pump as an electric motor is driven and an accumulated fluid amount in a wheel cylinder to which the brake fluid is supplied.
Figure 12:
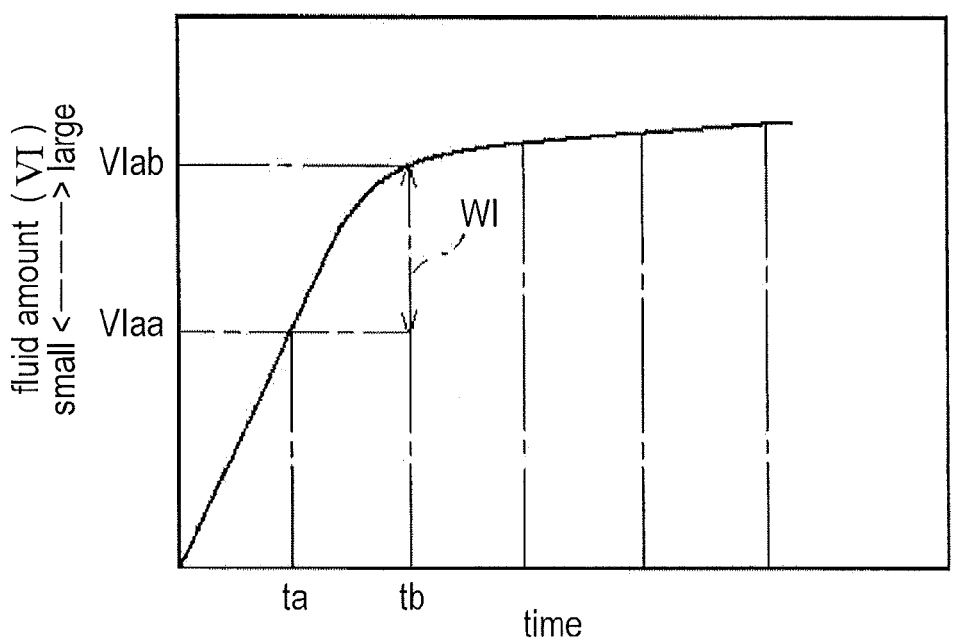
FIG. 12 shows a variation of the accumulated fluid amount of FIG. 11.
Figure 13:
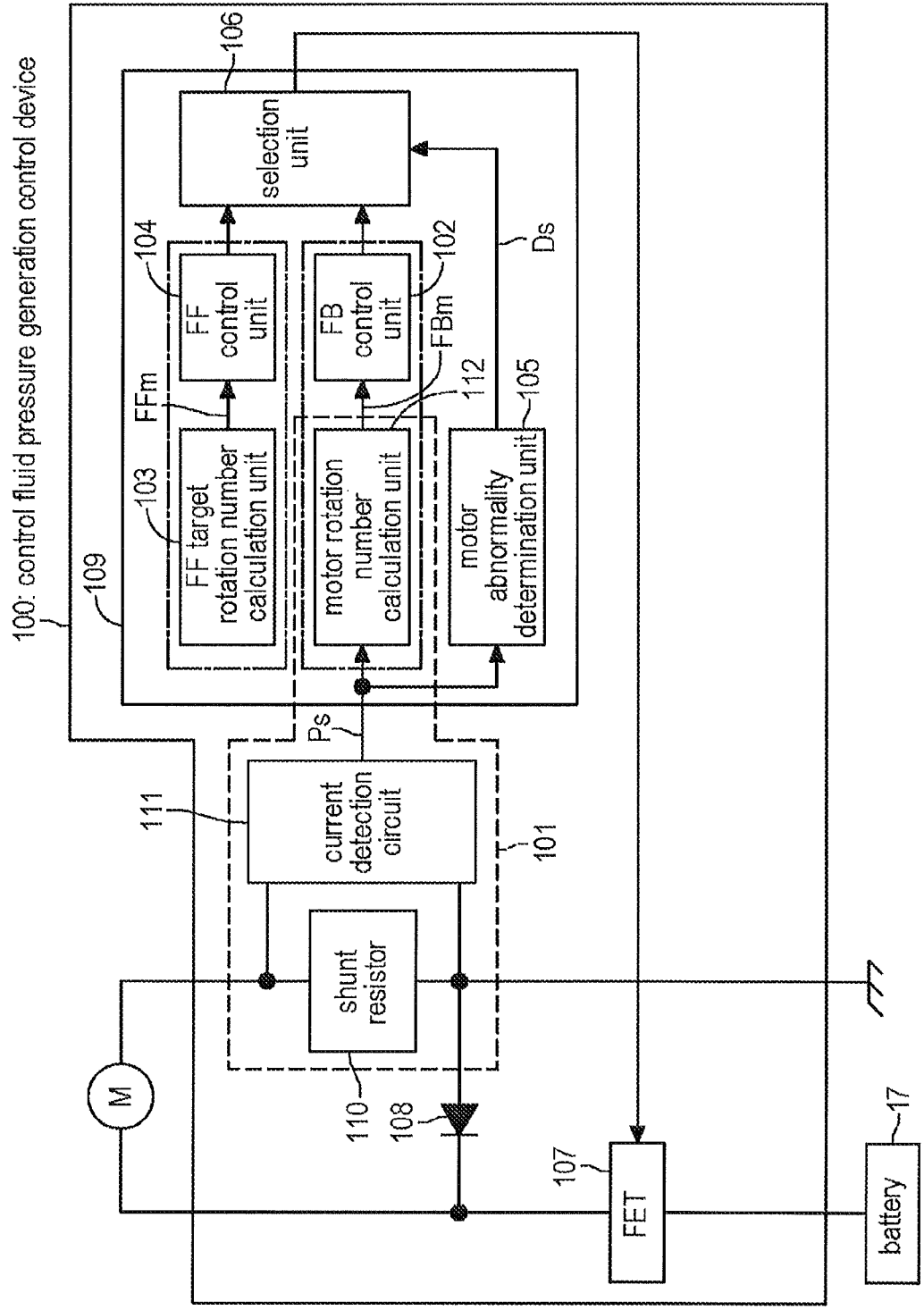
FIG. 13 shows a block diagram showing a structure of a control liquid pressure generating apparatus in the brake apparatus according to the exemplary embodiment.

FIG. 11 shows a relation between a difference ΔFrs of a regenerative braking force Fr corresponding to an amount of the brake operation and a regenerative braking force Fs that can be generated by the regenerative brake device A and a control fluid pressure PI of the fluid pressure control valves 31, 41 by a brake fluid that is discharged from the fluid pressure pumps 37, 47 as the electric motor M is driven. FIG. 11 shows a relation between the control fluid pressure PI of the fluid pressure control valves 31, 41 by the brake fluid that is discharged from the fluid pressure pumps 37, 47 as the electric motor M is driven and an accumulated fluid amount VI in the wheel cylinders WC1, WC2, WC3, WC4 to which the brake fluid is supplied. FIG. 12 shows a variation of the accumulated fluid amount of FIG. 11.

Figure 4:
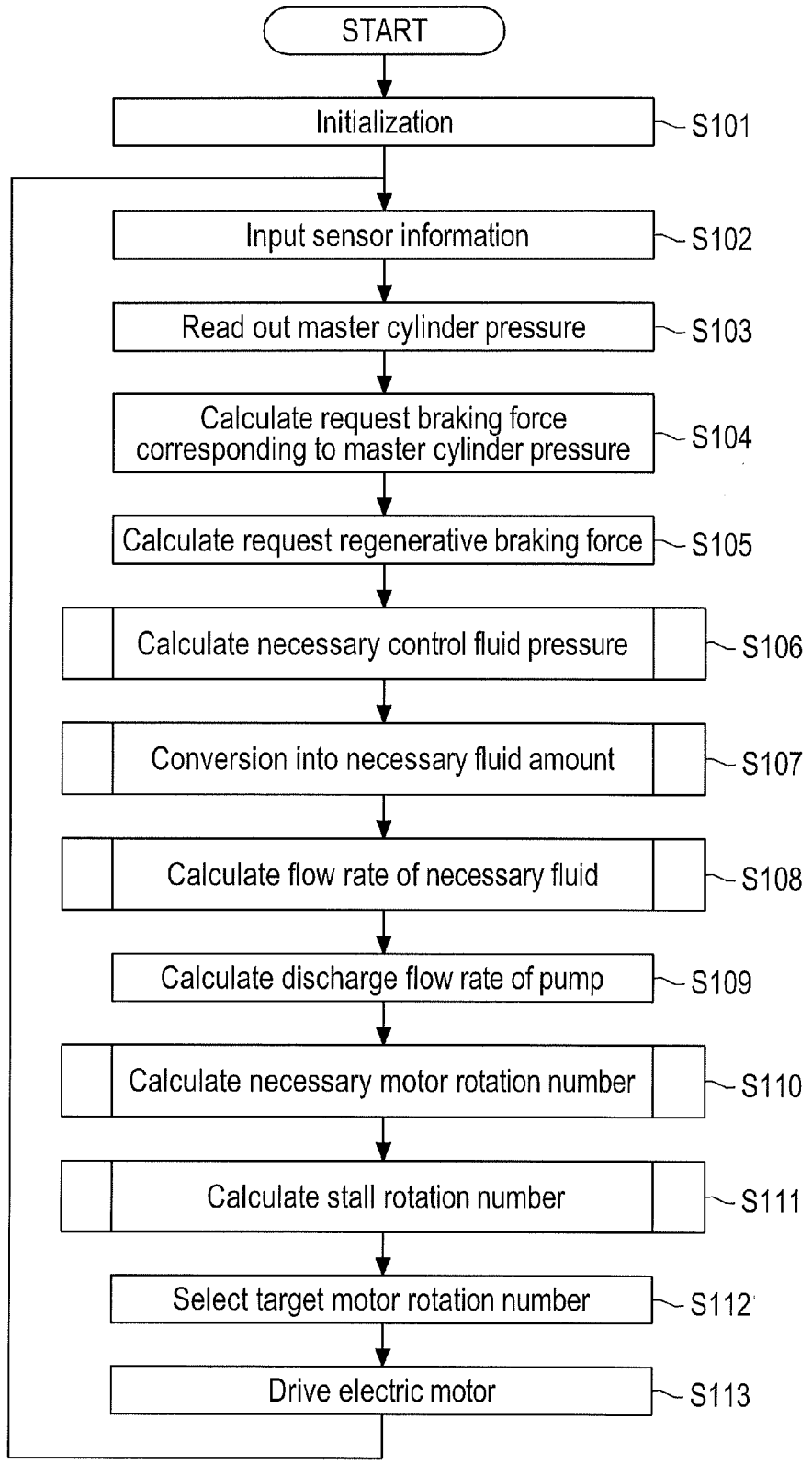
FIG. 4 is a flowchart for illustrating an operation of the brake apparatus for a vehicle shown in FIG. 1.

In the below, operations of the brake apparatus for a vehicle are described with reference to flowcharts of FIGS. 4 to 8. In the meantime, the brake ECU 60 executes programs corresponding to the flowcharts every predetermined short time when an ignition switch (not shown) of the vehicle becomes on, for example. As shown in FIG. 4, after initialization (step 101), a variety of sensor information is input to the brake ECU 60 from the pressure sensor P detecting a master cylinder pressure, the pedal stroke sensor 21a detecting a stroke amount of the brake pedal 21 and the like (step 102).

The brake ECU 60 reads out the master cylinder pressure of the input various sensor information, which master cylinder pressure is the brake operating state (step 103). Then, the brake ECU calculates a braking force to be requested (hereinafter, referred to as the 'request braking force') and a basic fluid pressure braking force corresponding to the read master cylinder pressure, and calculates a regenerative braking force to be requested (hereinafter, referred to as the 'request regenerative braking force), based on the calculated request braking force and basic fluid pressure braking force (step 104, which corresponds to the 'request braking force calculation means' and the 'basic fluid pressure braking force calculation means', and step 105, which corresponds to the 'request regenerative braking force calculation means'). Specifically, the brake ECU first calculates a request braking force Fa and a basic fluid pressure braking force Fba corresponding to the read master cylinder pressure Pa, based on a relation (refer to FIG. 9) between a master cylinder pressure P occurring in response to a brake operation and a total braking force F corresponding to an amount of the brake operation, and then calculates a request regenerative braking force Fra by subtracting the basic fluid pressure braking force Fba from the calculated request braking force Fa.

In order to generate the calculated request regenerative braking force, the brake ECU 60 calculates a control fluid pressure (hereinafter, referred to as the 'necessary control fluid pressure') necessary to generate a control fluid pressure braking force compensating for a deficiency of the regenerative braking force to be generated in the regenerative brake device A (step 106, which corresponds to the 'control fluid pressure setting means'). Specifically, the brake ECU 60 executes a necessary control fluid pressure calculation subroutine shown in FIG. 5. That is, the brake ECU 60 determines whether the vehicle is under braking state (step 201). When the vehicle is not under braking state, the brake ECU sets "0" as the regenerative braking force and the necessary control fluid pressure (steps 202, 203) and returns to step 201. On the other hand, when it is determined in step 201 that the vehicle is under braking state, the brake ECU further determines whether the regenerative brake operation is permitted (step 204). When the regenerative brake operation is not permitted, the brake ECU sets "0" as the regenerative braking force and the necessary control fluid pressure (steps 202, 203) and returns to step 201.

On the other hand, when it is determined in step 204 that the regenerative brake operation is permitted, the brake ECU compares the request regenerative braking force calculated in step 105 with a regenerative braking force (hereinafter, referred to as the current regenerative braking force) that can be currently generated by the regenerative brake device A, and determines whether the request regenerative braking force is higher than the current regenerative braking force (step 205). When the request regenerative braking force is the current regenerative braking force or lower, the request regenerative braking force is satisfied by the current regenerative braking force. Hence, the brake ECU sets "0" as the necessary control fluid pressure (step 206) and returns to step 201.

In this case, the brake ECU 60 outputs the request generative braking force to the hybrid ECU 19. Then, the hybrid ECU 19 is input with a regenerative request value indicative of the request regenerative braking force, controls the motor 12 via the inverter 16 so as to generate the regenerative braking force, based on the regenerative request value, considering the vehicle speed, the charged state of the battery and the like, and outputs a current regenerative execution value indicative of the current regenerative braking force to the brake ECU 60. At this time, the wheels FL, FR, RL, RR are applied with the basic fluid pressure braking force having only the regenerative braking force added thereto.

On the other hand, when it is determined in step 205 that the request regenerative braking force is higher than the current regenerative braking force, the brake ECU calculates a necessary control fluid pressure for supplementing a difference between the request regenerative braking force and the current regenerative braking force (step 207) and returns to step 201. Specifically, the brake ECU calculates a difference ΔFrsa between the request regenerative braking force Fra and the current regenerative braking force Fsa, and calculates a necessary control fluid pressure PIa, based on a relation (which is pre-stored and shown in FIG. 11) between a difference ΔFrs of the regenerative braking force Fr corresponding to an amount of the brake operation and the regenerative braking force Fs that can be generated by the regenerative brake device A and the control fluid pressure PI of the fluid pressure control valves 31, 41 by the brake fluid that is discharged from the fluid pressure pumps 37, 47 as the electric motor M is driven.

Returning to FIG. 4, the brake ECU 60 converts the necessary control fluid pressure calculated in step 207 into a fluid amount (hereinafter, referred to as the necessary fluid amount) necessary to generate a control fluid pressure braking force compensating for a deficiency of the regenerative braking force to be generated in the regenerative brake device A (step 107). Specifically, the brake ECU 60 executes a necessary fluid amount conversion subroutine shown in FIG. 6. That is, the brake ECU 60 reads out the necessary control fluid pressure (step 301), converts the calculated necessary control fluid pressure PIa into a necessary fluid amount Via (step 302), based on a relation (which is pre-stored and shown in FIG. 11) between the control fluid pressure PI of the fluid pressure control valves 31, 41 by the brake fluid that is discharged from the fluid pressure pumps 37, 47 as the electric motor M is driven and an accumulated fluid amount VI in the wheel cylinders WC1, WC2, WC3, WC4 to which the brake fluid is supplied, and then returns to step 301.

Returning to FIG. 4, the brake ECU 60 calculates a necessary flow rate, based on the necessary fluid amount converted in step 302 (step 108). Specifically, the brake ECU 60 executes a necessary flow rate calculation subroutine shown in FIG. 7. That is, as shown in FIG. 12, the brake ECU 60 reads out a necessary fluid amount every predetermined time, for example, a necessary fluid amount VIaa at time to and a necessary fluid amount VIab at time tb (step 401) and calculates a change amount VIab−VIaa of the necessary fluid amount during predetermined time tb−ta (step 402). Then, the brake ECU sets the calculated change amount VIab−VIaa of the necessary fluid amount as a necessary flow rate WI (step 403) and returns to step 401.

Returning to FIG. 4, the brake ECU 60 calculates a pump-necessary discharge flow rate of the fluid pressure pumps 37, 47, based on the necessary flow rate calculated in step 403 (step 109). Specifically, the brake ECU 60 adds a relief flow rate Wr necessary to operate the fluid pressure control valves 31, 41 to the necessary flow rate WI and sets the resulting flow rate as a pump-necessary discharge flow rate (WI+Wr). The brake ECU 60 calculates a necessary motor rotation number of the electric motor M, based on the calculated pump-necessary discharge flow rate (step 110, which corresponds to the 'target rotation number setting means'). Specifically, the brake ECU 60 executes a necessary motor rotation number calculation subroutine shown in FIG. 8. That is, the brake ECU 60 reads out the pump discharge flow rate (WI+Wr) (step 501), multiplies the read pump discharge flow rate (WI+Wr) by a flow rate-rotation number conversion coefficient k and sets the result thereof as a necessary motor rotation number k(WI+Wr) of the electric motor M (step 502) and then returns to step 501. The flow rate-rotation number conversion coefficient k is a coefficient indicative of a pump discharge flow rate of the fluid pressure pumps 37, 47 per one rotation number of the electric motor M. The flow rate-rotation number conversion coefficient k indicates a predetermined rotation number (which is indicated by a ratio) upon discharge of a predetermined flow rate, varies depending on a pump load and determines a relation indicating how to set a value of the ratio for any pump load when designing a pump. The flow rate-rotation number conversion coefficient k is determined from a relation between a preset pump load and the flow rate-rotation number conversion coefficient k (rev·s/cc) and the necessary control fluid pressure PIa read out in step 207, i.e., a pump load Rp that will be described later.

Returning to FIG. 4, the brake ECU 60 calculates a lowest necessary rotation number (hereinafter, referred to as a stall rotation number) at which the electric motor M does not stall (step 111).

Figure 14:
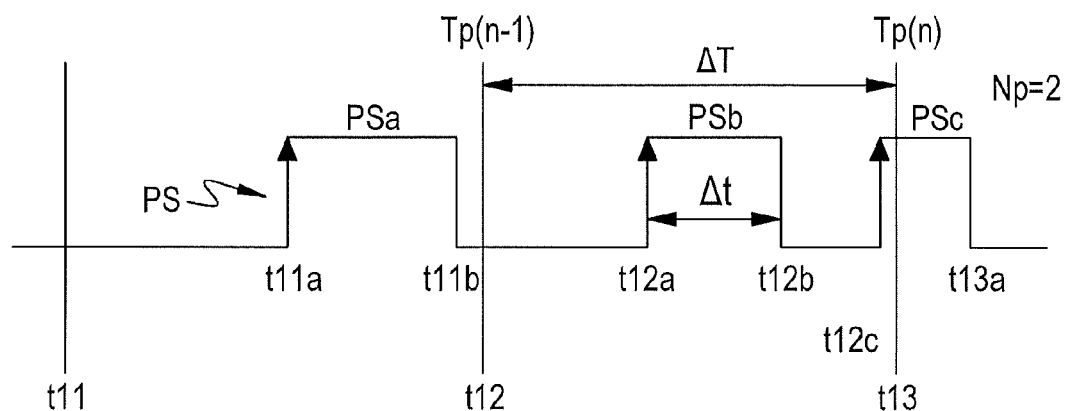
FIG. 14 is a timing chart for illustrating an operation that is made upon detection of a rotation number of an electric motor of the brake apparatus for a vehicle according to this exemplary embodiment.

Here, the rotation of the fluid pressure pumps 37, 47 is correlated with the rotation of the electric motor M, and an amount of work (load) that is made by the fluid pressure pumps 37, 47 and is indicated by a value obtained by multiplying the control fluid pressure and the control fluid flow rate is correlated with an amount of work (load) that is made by the electric motor M. A value obtained by multiplying the control fluid pressure and the control fluid flow rate in the fluid pressure pumps 37, 47 is equivalent to a load that is applied to the fluid pressure pumps 37, 47 as the electric motor M is driven. The amount of work that is made by the electric motor M is correlated with a lowest necessary rotation number at which the electric motor M does not stall. Accordingly, as shown in FIG. 14, the load that is applied to the fluid pressure pumps 37, 47 as the electric motor M is driven is correlated with the stall rotation number Rm of the electric motor M, and the stall rotation number Rm of the electric motor M can be calculated, considering the load Rp that is applied to the fluid pressure pumps 37, 47 as the electric motor M is driven.

Returning to FIG. 4, the brake ECU 60 compares the necessary motor rotation number calculated in step 502 with the stall rotation number calculated in step 602 and selects the larger one as the target rotation number (step 112, which corresponds to the 'target rotation number setting means'). Then, the brake ECU drives the electric motor M, based on the selected target rotation number (step 113) and returns to step 102 to thus repeat the above processing. The fluid pressure brake apparatus B applies the basic fluid pressure braking force corresponding to the master cylinder pressure and the control fluid pressure braking force corresponding to the target rotation number, and the regenerative brake device A applies the current regenerative braking force. Thereby, the total braking force where the control fluid pressure braking force and the regenerative braking force are added to the basic fluid pressure braking force is applied to the wheels.

In the below, an operation that is made when the brake ECU 60 performs the feedback control of the electric motor M is described. The brake ECU 60 has a control fluid pressure generation control device 100 shown in FIG. 13.

The control fluid pressure generation control device 100 has a rotation number detector 101, an FB control unit 102, an FF control target rotation number calculation unit 103, an FF control unit 104, a motor abnormality determination unit 105, a selection unit 106, a field effect transistor (FET) 107 and a diode 108 for current backflow prevention. The rotation number detector 101 has a shunt resistor 110, a current detection circuit 111 and a motor rotation number calculation unit 112. The motor rotation number calculation unit 112, the FB control unit 102, the FF control target rotation number calculation unit 103, the FF control unit 104, the motor abnormality determination unit 105 and the selection unit 106 are configured by software of a CPU 109 of the brake ECU 60.

The electric motor M has one end of a wiring thereof, which is connected to a battery 17 via source-drain of the FET 107 serving as a motor driving circuit, and the other end that is grounded via the shunt resistor 110. The current detection circuit 111 detects a current of both ends of the shunt resistor 110 to thus detect a load current of the electric motor M and outputs a pulse waveform signal PS, which has a waveform shaped in accordance with the detected current, to the motor rotation number calculation unit 112 and the motor abnormality determination unit 105. The motor rotation number calculation unit 112 calculates a rotation number of the electric motor M from the input pulse waveform signal PS and outputs the calculated motor rotation number FBm [rpm] to the FB control unit 102.

The electric motor M is a direct current electric motor having a brush that is rotated as a DC current is supplied thereto from the battery 17 via a brush and a commutator, for example. In the direct current electric motor having the brush, the rotation number detector 101 counts a ripple component, which is generated in the current to be supplied to the electric motor M in a unit time by disconnection between the brush and the commutator, thereby detecting the motor rotation number FBm.

In the below, the calculation of the motor rotation number FBm is described with reference to FIG. 14. First, it is assumed that the pulse waveform signal PS having pulse waveforms PSa, PSb, PSc is output from the current detection circuit 111. The motor rotation number calculation unit 112 samples a rising edge of the pulse waveform signal PS with a constant period (sampling period) ΔT shown in time t12 to t13, for example. Here, the sampling period ΔT is expressed by a following equation (1).

$$\Delta T = Tp(n) - Tp(n-1) \tag{1}$$

Then, the motor rotation number calculation unit 112 calculates a time interval Δt per one pulse of the pulse waveform signal PSb sampled with the sampling period ΔT. Δt is expressed by a following equation (2).

$$\Delta t = \Delta T / Np(n) \tag{2}$$

Here, Np(n) is a sampling number of the rising edge in the one sampling period ΔT. In this example, Np(n)=2.

Here, when dividing a reciprocal of the time interval Δt per one pulse, i.e., 1/t by the number of slots of the electric motor M ((1/t)÷the number of slots), the motor rotation number per one second [s] is obtained. Therefore, the motor rotation number FBm [rpm] per one minute is calculated by a following equation (3).

$$FBm[\text{rpm}] = (1/t) \div \text{the number of slots} \times 60\ [s] \tag{3}$$

In the FB control unit 102, a difference between the motor rotation number FBm calculated as described above and the FB control target rotation number is obtained, and a driving voltage, which is obtained by adding a correction amount corresponding to the difference to a basic voltage corresponding to the motor rotation number, is supplied to a gate of the FET 107 that is a driving circuit of the electric motor M, so that the feedback control is performed.

Meanwhile, in the FF control target rotation number calculation unit 103, a motor rotation number FFm is calculated as the FF control target rotation number higher than the FB control target rotation number by a predetermined margin rotation number, a voltage from the FF control unit 104 is supplied to the gate of the FET 107 so that the electric motor M reaches the motor rotation number FFm, and the feed forward control is thus performed.

The motor abnormality determination unit 105 determines whether a detected state of the motor rotation number is normal or abnormal from the pulse waveform signal PS. In this determination, when a time width (period) of the pulse waveform signal PS is within a predetermined normal range, it is determined that the detected motor rotation number FBm is normal, and when the time width is beyond the range (including a case where a pulse waveform is not output), it is determined that the detected motor rotation number is abnormal. When it is determined normal, the motor abnormality determination unit outputs a detection signal Ds having an 'L' level to the selection unit 106 and when it is determined abnormal, the motor abnormality determination unit outputs a detection signal Ds having an 'H' level to the selection unit.

When the detection signal Ds having an 'L' level is supplied from the motor abnormality determination unit 105, the selection unit 106 selects a signal output from the FB control unit 102, and when the detection signal Ds having an 'H' level is supplied, the selection unit selects a signal output from the FF control unit 104.

That is, when it is determined normal in the motor abnormality determination unit 105, the detection signal Ds having an 'L' level is supplied to the selection unit 106. In the selection unit 106, the driving voltage output from the FB control unit 102 is selected and is applied to the gate terminal of the FET 107 via the selection unit 106, so that the power from the battery 17 is fed to the electric motor M and the feedback control is thus performed so that the electric motor M reaches the FB control target rotation number.

On the other hand, when it is determined abnormal in the motor abnormality determination unit 105, the detection signal Ds having an 'H' level is supplied to the selection unit 106. Thus, in the selection unit 106, the driving voltage by the basic voltage corresponding to the motor rotation number for feed forward control from the FF control unit 104 is selected and is applied to the gate terminal of the FET 107 via the selection unit 106, so that the power from the battery 17 is fed to the electric motor M and the feed forward control is thus performed so that the electric motor M reaches the FF control target rotation number.

Figure 15:
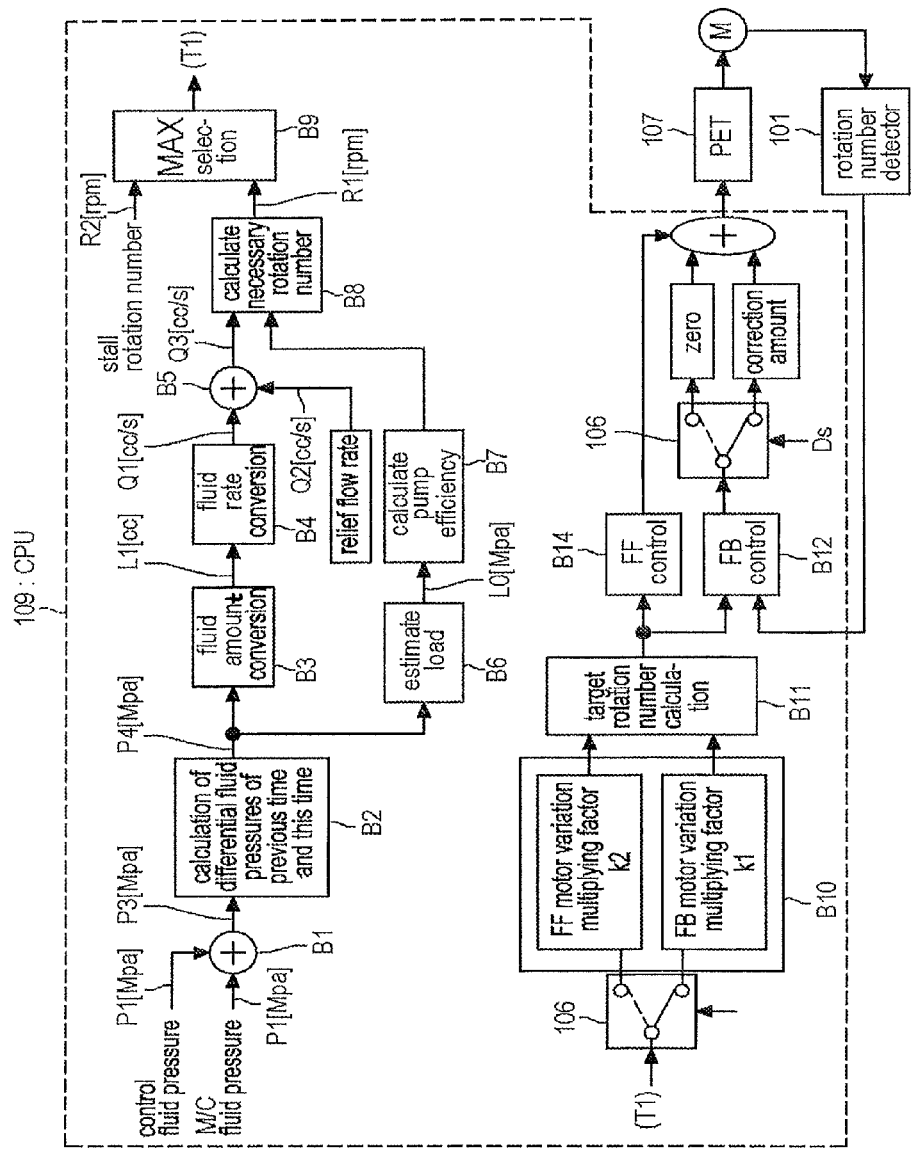
FIG. 15 is a logic block diagram when a CPU of a brake ECU having the control fluid pressure generation control device performs feedback control and feed forward control.

In the below, an operation is described with reference to FIG. 15, which is made when the fluid pressure pumps 37, 47 are driven by the electric motor M that is rotated under feedback control or feed forward control and a braking force is generated by the control fluid pressure formed by the driving of the pumps and the control of fluid pressure control valves 31, 41. Here, FIG. 15 is a logic block diagram when the CPU 109 shown in FIG. 13 performs the feedback control and the feed forward control.

First, an operation that is made when generating the control fluid pressure braking force under feedback control is described. When the basic fluid pressure corresponding to the brake operating state is generated by the master cylinder 23, the control fluid pressure, which is formed by the driving of the fluid pressure pumps 37, 47 and the control of fluid pressure control valves 31, 41 independently of the basic fluid pressure, is applied to the respective wheel cylinders WC1 to WC4, so that the control fluid pressure braking force is generated for the respective wheels FL to RR (which corresponds to S101 to S105 of FIG. 4). At this time, in the CPU 109 of FIG. 15, the control fluid pressure P1 [Mpa] and the master cylinder fluid pressure (M/C fluid pressure) P2 [Mpa] are added in control step B1, and in the added fluid pressure P3 [Mpa], a difference between added fluid pressures of previous time and this time for a predetermined time interval is calculated in control step B2 and the differential fluid pressure becomes a request fluid pressure P4 [Mpa] (which corresponds to S106), which is necessary for the control fluid pressure braking force.

Then, in control step B3, the request fluid pressure P4 [Mpa] is converted into a request fluid amount L1 [cc] (which corresponds to S107). The request fluid amount L1 [cc] obtained by the conversion is further converted into a request flow rate Q1 [cc/s] in control step B4, which is a flow rate for one second (which corresponds to S108). The request flow rate Q1 [cc/s] is a necessary flow rate for the wheel cylinders WC1 to WC4. However, since the pressure is adjusted while the necessary flow rate is relieved through the fluid pressure control valves 31, 41, it is necessary to constantly relieve the control fluid pressure from the fluid pressure control valves 31, 41 all the time. Therefore, in control step B5, a relief flow rate Q2 [cc/s], which is necessary to operate the fluid pressure control valves 31, 41, is added to the request flow rate Q1 [cc/s] obtained in control step B4, so that a necessary pumping flow rate Q3 [cc/s] of the fluid pressure pimps 37, 47 is obtained (which corresponds to S109).

Meanwhile, in control step B6, a pressure load L0 (=P4 [Mpa]) of the fluid pressure pumps 37, 47 is estimated from the request fluid pressure P4 [Mpa] obtained in control step B2. In control step B7, a pump efficiency E1 [cc/rev] corresponding to a pump load at present time is calculated, as a coefficient for converting the flow rate and the rotation number, from a predetermined relation between the fluid pressure pump load L0 and the pump efficiency E1 [cc/rev] and the estimated load L0=P4. In control step B8, a necessary rotation number R1 [rpm] of the electric motor M is obtained by dividing the pumping flow rate Q3 [cc/s] by the pump efficiency E1 [cc/rev] (which corresponds to S110).

Then, in control step B9, the necessary rotation number R1 [rpm] of the motor is compared with a stall rotation number R2 [rpm] that is the lowest rotation number at which the electric motor M does not stall (which corresponds to S111), so that a larger rotation number is selected as the target rotation number.

Figure 5:
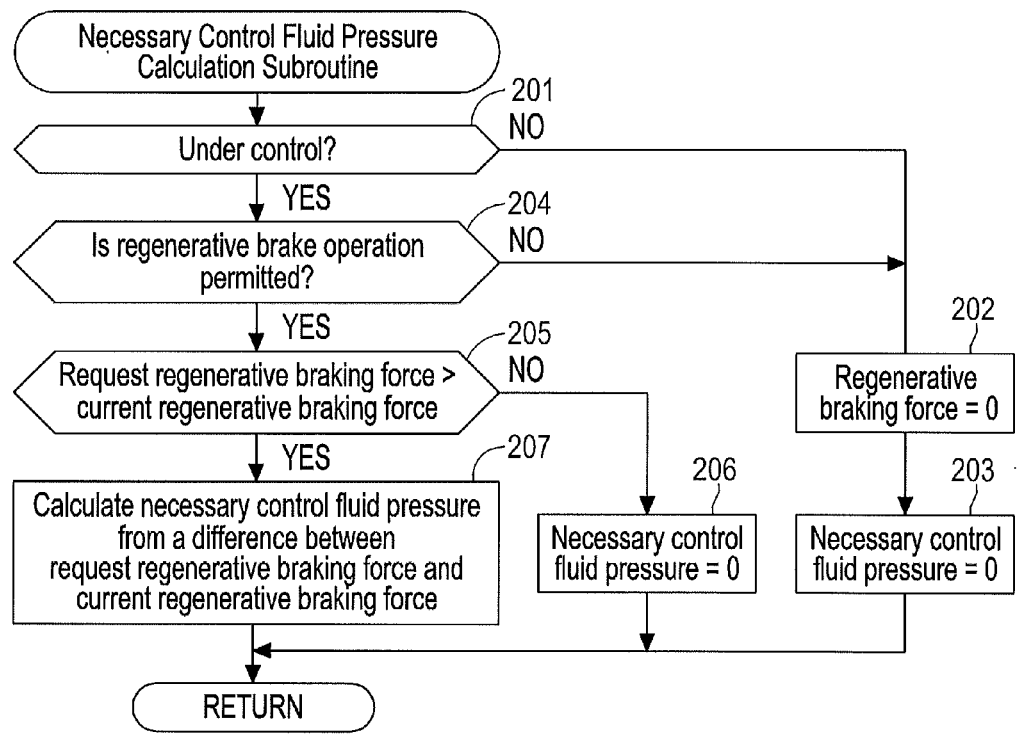
FIG. 5 is a flowchart for illustrating a necessary control fluid pressure calculation subroutine shown in FIG. 4.
Figure 6:
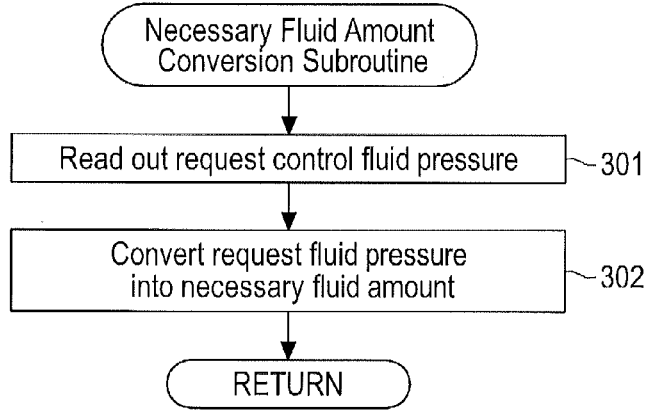
FIG. 6 is a flowchart for illustrating a necessary fluid amount conversion subroutine shown in FIG. 4.
Figure 7:
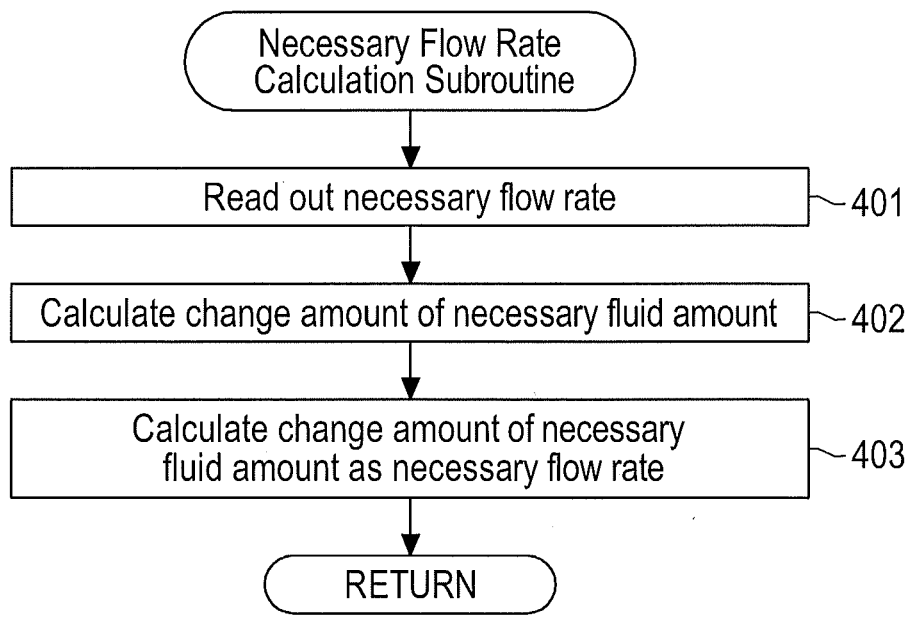
FIG. 7 is a flowchart for illustrating a necessary flow rate calculation subroutine shown in FIG. 4.
Figure 8:
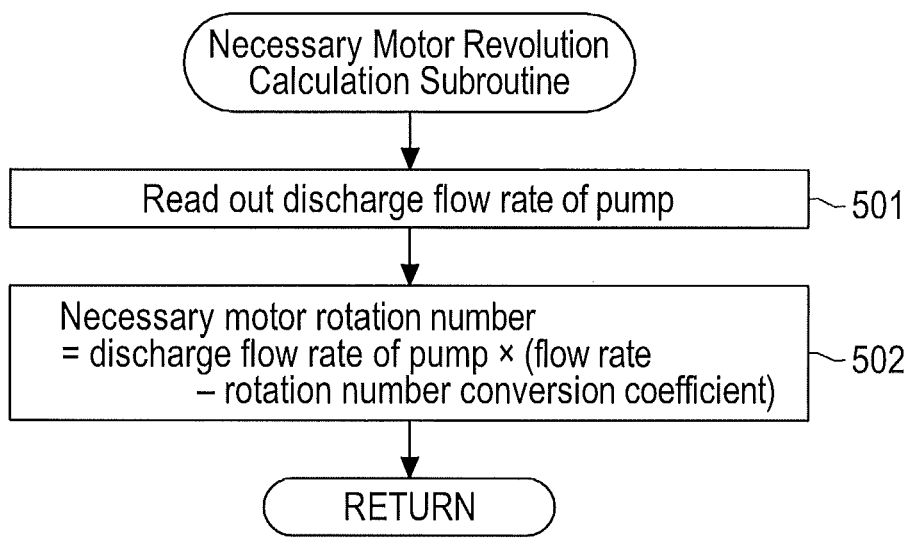
FIG. 8 is a flowchart for illustrating a necessary motor rotation number calculation subroutine shown in FIG. 4.

Here, when the motor abnormality determination unit 105 determines that the detection state of the rotation number is normal, the detection signal Ds having an 'L' level is supplied to the selection unit 106 shown in FIG. 5. Therefore, the selection unit 106 selects the feedback control shown with the solid line. In this case, in control step B10, the necessary rotation number R1 [rpm] of the motor selected in control step B9 is multiplied by an FB motor variation multiplying factor k1 (for example, 1.1 times), and a result of the multiplication is set as the FB control target rotation number in control step B11 (which corresponds to S112).

In control step B14, the electric motor M supplies the basic voltage corresponding to the FB control target rotation number to the control step B13.

In control step B12, a difference between the FB control target rotation number and the actual motor rotation number FBm detected in the rotation number detector 101 is calculated. A correction amount by a voltage corresponding to the difference is added to the basic voltage in control step B13, so that a driving voltage is obtained. The driving voltage is supplied to the gate of the FET 107 serving as the motor driving circuit, so that the electric motor M is driven at the FB control target rotation number under feedback control (which corresponds to S113).

Figure 16:
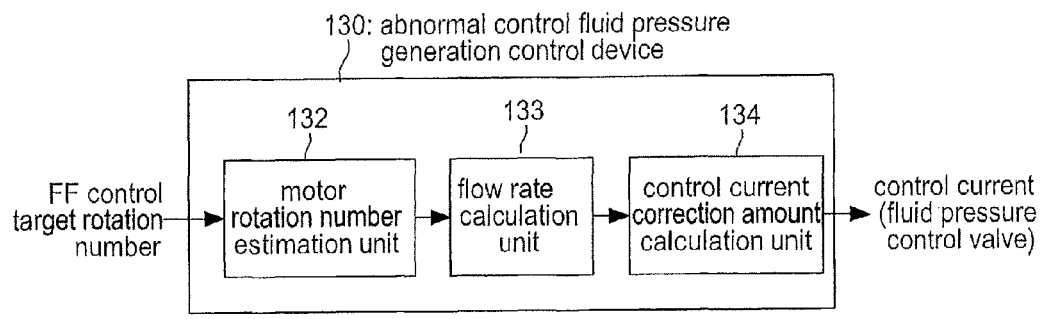
FIG. 16 is a block diagram showing a configuration of an abnormal control fluid pressure generation control device of the brake apparatus for a vehicle of this exemplary embodiment.

In the below, an operation that is made when the control is switched from the feedback control to the feed forward control in a case where the motor abnormality determination unit 105 determines that the detection state of the motor rotation number is abnormal is described with reference to FIGS. 15 and 16.

When the motor abnormality determination unit 105 determines that the detection state of the motor rotation number is abnormal, the detection signal Ds having an 'H' level is supplied to the selection unit 106 shown in FIG. 15. Therefore, the selection unit 106 is switched to the feed forward control shown with the broken line. Thereby, in control step B10, the necessary rotation number R1 [rpm] of the motor selected in control step B9 is multiplied by an FF motor variation multiplying factor k2 (for example, 1.5 times) that is higher than the FB motor variation multiplying factor k1 by a predetermined value. A result of the multiplication is set as the FF control target rotation number in control step B11 (which corresponds to S112).

The FF motor variation multiplying factor k2 is obtained, considering at least initial conditions of the motor, deterioration of the motor durability, a discharge pressure of the motor that is the pumping flow rate and a motor temperature. In order to supply the minimum necessary relief flow rate Q2 [cc/s], the FF control target rotation number is set to be a rotation number considering the FF motor variation multiplying factor k2.

That is, in control step B14, the feed forward control is performed in which the basic voltage from the FF control unit 104 is supplied to the gate of the FET 107 as the driving voltage so that the electric motor M reaches the motor rotation number FFm corresponding to the calculated FF control target rotation number higher than the FB control target rotation number by a predetermined margin rotation number (which corresponds to S113). In this case, the correction amount from the FB control unit 102 is zero in control step B12. Therefore, in control step B13, only the voltage corresponding to the FF control target rotation number by the control step B14 is selected.

At the same time, upon the switching to the feed forward control, the control current is supplied to the fluid pressure control valves 31, 41 by an abnormal control fluid pressure generation control device 130 that is provided to the brake ECU 60 and shown in FIG. 16, as follows.

That is, the abnormal control fluid pressure generation control device 130 has a motor rotation number estimation unit 132, a flow rate calculation unit 133 and a control current correction calculation unit 134. The motor rotation number estimation unit 132 estimates a motor rotation number that gradually increases in response to the FF control target rotation number obtained in control step B11. The flow rate calculation unit 133 estimates a passing flow rate of the fluid pressure control valves 31, 41 that gradually increases in response to the pumping flow rate of the fluid pressure pumps 37, 47 corresponding to the estimated motor rotation number.

The control current correction calculation unit 134 calculates a control current that controls opening and closing of the fluid pressure control valves 31, 41 in response to the estimated passing flow rate. That is, the control current correction calculation unit controls the control current of the fluid pressure control valves 31, 41, as follows, considering a response of the electric motor M and a response of the passing flow rate of the fluid pressure control valves 31, 41. This is to control the control current to be applied to the fluid pressure control valves 31, 41 so that the control current is gradually changed so that the wheel cylinder fluid pressure is not changed even when the electric motor M rotates with the FF control target rotation number, which is higher than the FB control target rotation number by the margin rotation number, and thus the brake fluid passing through the fluid pressure control valves 31, 41 gradually increases.

At this time, the response of the electric motor M is calculated from a mechanical time constant that is generally known. The mechanical time constant is calculated in response to the pump loads of the fluid pressure pumps 37, 47, a fluid viscosity and a motor temperature that is changed depending on the load of the electric motor M. The pump loads are calculated detecting the pump pressures by the pressure sensor P and the fluid viscosity and the motor temperature are calculated by a monitor or estimation.

Regarding the response of the passing flow rates of the fluid pressure control valves 31, 41, a delay of the flow rates is calculated from a hydraulic pressure circuit by a pipe diameter from the fluid pressure pumps 37, 37 to the fluid pressure control valves 31, 41, a pipe length, a fluid viscosity, a fluid density, an orifice diameter and the like.

An operation of the abnormal control fluid pressure generation control device 130 is described. First, when the control is switched from the feedback control to the feed forward control at time t1 of (a) of FIG. 17, the motor rotation number estimation unit 132 estimates a motor rotation number, which gradually increases (which is shown with a curve r2 in (b) of FIG. 17) in response to the FF control target rotation number obtained in control step B11.

Figure 17:
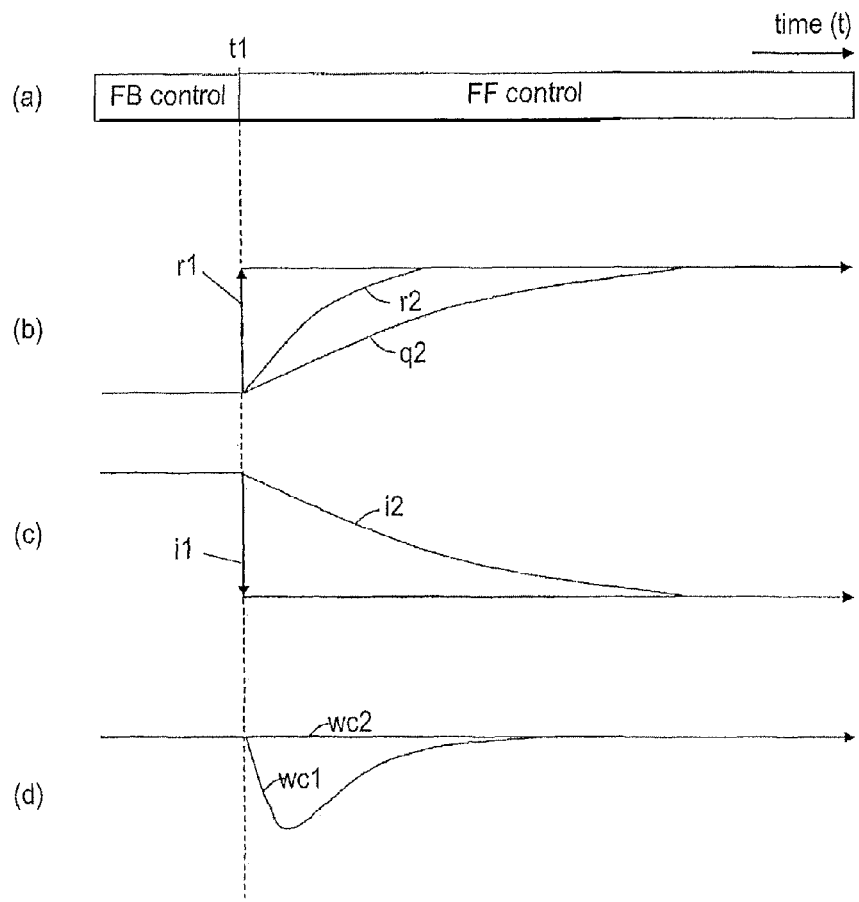
FIG. 17 shows temporal changes of a motor rotation number, a fluid pressure control valve passing flow rate, a control current for a fluid pressure control valve and a fluid pressure of a wheel cylinder after the control is switched from the feedback control to the feed forward control.

Then, the flow rate calculation unit 133 estimates the passing flow rate of the fluid pressure control valves 31, 41, which gradually increases (which is shown with a curve q2 in (b) of FIG. 17) in response to the pumping flow rate of the fluid pressure pumps 37, 47 corresponding to the estimated motor rotation number r2. Then, the control current correction calculation unit 134 calculates the control current (which is shown with a curve i2 gradually decreasing in (c) of FIG. 17) that controls the opening and closing of the fluid pressure control valves 31, 41 in response to the estimated passing flow rates q2. That is, the control current i2 is gradually changed so that even when the electric motor M rotates with the FF control target rotation number and thus the brake fluid passing through the fluid pressure control valves 31, 41 gradually increases, as shown with the curve q2, the wheel cylinder fluid pressure is not changed, as shown with a line wc2 in (d) of FIG. 17, i.e., the wheel cylinder fluid pressure wc2 is constant.

Like this, according to the brake apparatus for a vehicle of this exemplary embodiment, it is possible to control the control current i2 to the fluid pressure control valves 31, 41 so that the wheel cylinder fluid pressure wc2 is not changed upon the switching from the feedback control to the feed forward control. Therefore, the deviation of the prior art is not caused regarding the pumping flow rate of the fluid pressure pumps 37, 47 and the degree of opening of the fluid pressure control valves 31, 41. Thus, when the driver operates the brake, the wheel cylinder fluid pressure is smoothly changed, so that the driver does not feel uncomfortable upon the brake operation.

The mechanical time constant is switched in response to at least the pumping flow rate of the fluid pressure pumps 37, 47, the response of the electric motor M is calculated using the mechanical time constant, the response of the passing flow rate of the fluid pressure control valves 31, 41 is calculated in response to the flow path resistance from the fluid pressure pumps 37, 47 to the fluid pressure control valves 31, 41 and the viscosity of the brake fluid and the responses are reflected when estimating the motor rotation number and the passing flow rate of the fluid pressure control valves 31, 41. Therefore, the estimation precision of the motor rotation number is enhanced, so that it is possible to estimate the passing flow rate of the fluid pressure control valves 31, 41 with higher precision. Thereby, it is possible to variably control the control current to the fluid pressure control valves 31, 41 more appropriately and to thus control the wheel cylinder fluid pressure to be constant.

In the brake apparatus for a vehicle of the above exemplary embodiment, the fluid pressure brake apparatus B and the regenerative brake device A are cooperatively controlled. However, the brake apparatus for a vehicle can be used as a brake apparatus for a vehicle having a traction control device, a brake assist control device, a hill start control device, an active cruise control device and the like. That is, in order to apply a braking force, which is necessary depending on the traveling state of the vehicle, to the wheels, the electric motor is rotated with the target rotation number, so that the brake fluid having a relief flow rate necessary to operate the fluid pressure control valves is circulated from the fluid pressure pumps to the fluid pressure control valves and the control current is applied to the fluid pressure control valves. Thereby, the brake apparatus for a vehicle can be used as a brake apparatus for a vehicle having a control fluid pressure generation device that generates a control fluid pressure, which is set in the fluid pressure control valves in response to the request power.

In the traction control, when the slipping amount of the driving wheels FL, FR exceeds a predetermined value and also increases, the fluid pressure is supplied from the control fluid pressure generation device to the wheel cylinders WC1, WC2 of the driving wheels FL, FR, the fluid pressure is controlled by the fluid pressure control valves 31, 41 in response to the slipping amount. When the slipping amount exceeds a predetermined value and does not increase, the pressure generation device is stopped, the fluid pressure, which is controlled by the fluid pressure control valves 31, 41 in response to the slipping amount, is sealed in the wheel cylinders WC1, WC2 of the driving wheels FL, FR. When the slipping amount is a predetermined value or smaller, the wheel cylinders WC1, WC2 of the driving wheels FL, FR are connected to the pressure adjusting reservoirs 34, 44. Thereby, the fluid pressure braking force is applied to the wheels by the brake means in response to the slipping amount.

In the brake assist control, when the brake is urgently applied or when a strong braking force is generated, the fluid pressure is supplied from the pressure generation device to the wheel cylinders WC1, WC2 of the driving wheels FL, FR and the fluid pressure is controlled by the fluid pressure control valves 31, 41 so that it becomes a fluid pressure higher than the fluid pressure to be supplied from the master cylinder 23. Thereby, the high fluid pressure braking force is applied to the wheels by the brake means.

In the hill start control, when a vehicle starts on a sloping road, the fluid pressure is supplied from the pressure generation device to the wheel cylinders WC1, WC2 of the driving wheels FL, FR and the fluid pressure is controlled to be a stop state-keeping fluid pressure by the fluid pressure control valves 31, 41. Thereby, the fluid pressure braking force that keeps the vehicle on the sloping road at a stopped state is applied to the wheels by the brake means.

In the active cruise control, in order to maintain an inter-vehicular distance at a predetermined value or larger, the fluid pressure is supplied from the pressure generation device to the wheel cylinders WC1, WC2 of the driving wheels FL, FR and the fluid pressure is controlled by the fluid pressure control valves 31, 41. When the inter-vehicular distance becomes the predetermined value or smaller, the fluid pressure braking force is automatically applied to the wheels by the brake means.

In the above exemplary embodiment, the brake piping system of the fluid pressure brake apparatus B is provided at the front and rear of the FF vehicle. However, it may be provided at the front and rear of an FR vehicle. The negative pressure booster 22 is used as the boosting apparatus. However, a boosting apparatus that accumulates a fluid pressure generated by a pump in an accumulator and performs the boosting by using the fluid pressure may be used. In the above exemplary embodiment, the flow rate-rotation number conversion coefficient k is determined as a value that is varied in response to the pump load. However, the invention is not limited thereto. For example, when the flow rate-rotation number conversion coefficient k is designed so that it is constant with regard to the pump load when designing the pump, a constant value may be adopted regardless of the pump load.

According to the present invention, when the control is switched from the feedback control to the feed forward control in a case where the rotation number detector is abnormal, the electric motor is rotated with the FF control target rotation number, which is higher by the margin rotation number, so that the brake fluid passing through the fluid pressure control valve is gradually increased. However, the control current to be supplied to the fluid pressure control valve is gradually changed so that the wheel cylinder fluid pressure is not changed. Therefore, it is possible to prevent the wheel cylinder fluid pressure from being lowered upon a brake operation, so that it is possible to prevent a driver from feeling uncomfortable.

In the present invention, the control fluid pressure may be set based on the difference between the request regenerative braking force and the current regenerative braking force, the FB control target rotation number of the electric motor may be set based on the amount of the brake fluid, which is supplied to the wheel cylinders in correspondence to the change in the control fluid pressure, and the relief flow rate necessary to operate the fluid pressure control valve. Also in this case, it is possible to prevent a driver from feeling uncomfortable upon the brake operation, like the above invention.

Furthermore, in the present invention, the electric motor may be configured by a direct current electric motor. The rotation number detector that detects the motor rotation number by counting a ripple component of the supply current may be used to reduce the cost. Also in this case, when the control is switched from the feedback control to the feed forward control in a case where the rotation number detector is abnormal, the control current to the fluid pressure control valve is gradually changed to prevent the wheel cylinder fluid pressure from being lowered.

Furthermore, in the present invention, the electric motor can be rotated with the FF control target rotation number higher that the FB control target rotation number by the margin rotation number. Thereby, a time constant during which the brake fluid passing through the fluid pressure control valve is gradually increased can be appropriately calculated. This is because the time constant is calculated based on a time constant of a motor response calculated considering at least a load of the fluid pressure pump and a time constant of a flow rate response calculated considering at least a flow path resistance of a piping circuit of circulating the brake fluid from the fluid pressure pump to the fluid pressure control valve and a viscosity of the brake fluid. Like this, since it is possible to appropriately calculate the time constant at the time that the brake fluid passing through the fluid pressure control valve gradually increases, it is possible to appropriately control the control current to the fluid pressure control valve in correspondence to the gradual increase of the passing brake fluid. Thereby, when the control is switched from the feedback control to the feed forward control, it is possible to prevent the wheel cylinder fluid pressure from being lowered.

What is claimed is:
1. A brake apparatus for a vehicle comprising:
   a master cylinder configured to generate a master cylinder fluid pressure corresponding to a brake operation;
   a wheel brake device that is provided for each wheel and configured to apply a braking force to the wheels as a brake fluid is supplied from the master cylinder to wheel cylinders;
   a fluid pressure control valve connected between the master cylinder and the wheel cylinders;
   a fluid pressure pump having a discharge port communicating between the fluid pressure control valve and the wheel cylinders and a suction port communicating between the master cylinder and the fluid pressure control valve;
   an electric motor configured to drive the fluid pressure pump;

a rotation number detector configured to detect a motor rotation number of the electric motor;

a feedback control circuit configured to correct a control power corresponding to a feedback control target rotation number of the electric motor in response to a difference between the motor rotation number detected by the rotation number detector and the feedback control target rotation number of the electric motor and feed the corrected control power to a driving circuit of the electric motor;

a feed forward control circuit configured to feed, to the driving circuit, a control power corresponding to a feedforward control target rotation number of the electric motor;

a control fluid pressure generation control device configured to rotate the electric motor with the feedback control target rotation number by the feedback control circuit to circulate the brake fluid having a target flow rate from the fluid pressure pump to the fluid pressure control valve and supply a control current to the fluid pressure control valve to control a wheel cylinder fluid pressure occurring in the wheel cylinders so that the wheel cylinder fluid pressure is higher than the master cylinder fluid pressure by a control fluid pressure; and an abnormal control fluid pressure generation control device configured to, if an abnormality detection device detects that the rotation number detector is abnormal, rotate the electric motor with the feed-forward control target rotation number by the feed forward control circuit, which is higher than the feedback control target rotation number by a margin rotation number, gradually increase the brake fluid passing through the fluid pressure control valve as the electric motor is rotated with the feed-forward control target rotation number, which is higher than the feedback control target rotation number by the margin rotation number, and gradually change the control current to be supplied to the fluid pressure control valve so that the wheel cylinder fluid pressure is not changed.

2. The brake apparatus according to claim 1 further comprising:

a regenerative brake device configured to generate a regenerative braking force for the wheels;

a request braking force calculation unit configured to calculate a request braking force corresponding to an amount of the brake operation;

a basic fluid pressure braking force calculation unit configured to calculate a basic fluid pressure braking force to be generated by the master cylinder fluid pressure;

a request regenerative braking force calculation unit configured to calculate a request regenerative braking force by subtracting the basic fluid pressure braking force from the request braking force;

a control fluid pressure setting unit configured to set the control fluid pressure, based on a difference between the request regenerative braking force and a current regenerative braking force that the regenerative brake device can currently generate; and a feedback control target rotation number setting unit configured to set the feedback control target rotation number of the electric motor, based on an amount of the brake fluid, which is supplied to the wheel cylinders based on a change in the control fluid pressure, and a relief flow rate necessary to operate the fluid pressure control valve.

3. The brake apparatus according to claim 1, wherein the electric motor is a direct current electric motor that rotates as a DC current is supplied thereto via a brush and a commutator, and the rotation number detector detects the motor rotation number of the electric motor by counting a ripple component, which is generated in the current to be supplied to the electric motor in a unit time by disconnection between the brush and the commutator.

4. The brake apparatus according to claim 1 further comprising a time constant calculating unit configured to calculate a time constant during which the brake fluid passing through the fluid pressure control valve is gradually increased as the electric motor is rotated with the feed-forward control target rotation number higher by the margin rotation number based on a time constant of a motor response calculated considering at least a load of the fluid pressure pump and a time constant of a flow rate response calculated considering at least a flow path resistance of a piping circuit of circulating the brake fluid from the fluid pressure pump to the fluid pressure control valve and a viscosity of the brake fluid.

5. The brake apparatus according to claim 2, wherein the electric motor is a direct current electric motor that rotates as a DC current is supplied thereto via a brush and a commutator, and the rotation number detector detects the motor rotation number of the electric motor by counting a ripple component, which is generated in the current to be supplied to the electric motor in a unit time by disconnection between the brush and the commutator.

6. The brake apparatus according to claim 2 further comprising a time constant calculating unit configured to calculate a time constant during which the brake fluid passing through the fluid pressure control valve is gradually increased as the electric motor is rotated with the feed-forward control target rotation number higher by the margin rotation number based on a time constant of a motor response calculated considering at least a load of the fluid pressure pump and a time constant of a flow rate response calculated considering at least a flow path resistance of a piping circuit of circulating the brake fluid from the fluid pressure pump to the fluid pressure control valve and a viscosity of the brake fluid.

* * * * *